(12) United States Patent
Takagi et al.

(10) Patent No.: US 7,024,532 B2
(45) Date of Patent: Apr. 4, 2006

(54) FILE MANAGEMENT METHOD, AND MEMORY CARD AND TERMINAL APPARATUS THAT MAKE USE OF THE METHOD

(75) Inventors: Yoshihiko Takagi, Tokyo (JP); Yoshiaki Nakanishi, Tokyo (JP); Osamu Sasaki, Tokyo (JP); Tsutomu Sekibe, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 425 days.

(21) Appl. No.: 10/211,586

(22) Filed: Aug. 5, 2002

(65) Prior Publication Data
US 2003/0033496 A1    Feb. 13, 2003

(30) Foreign Application Priority Data
Aug. 9, 2001    (JP)    ............................. 2001-242499

(51) Int. Cl.
G06F 12/00    (2006.01)
(52) U.S. Cl. ..................................... 711/163
(58) Field of Classification Search ................ 711/147, 711/153, 154, 156, 163, 206; 714/27
See application file for complete search history.

(56) References Cited

U.S. PATENT DOCUMENTS

| 5,226,155 | A |   | 7/1993  | Iijima         |         |
|-----------|---|---|---------|----------------|---------|
| 5,293,424 | A | * | 3/1994  | Holtey et al.  | 713/193 |
| 5,404,485 | A | * | 4/1995  | Ban            | 711/202 |
| 5,442,704 | A | * | 8/1995  | Holtey         | 711/163 |
| 5,471,615 | A |   | 11/1995 | Amatsu et al.  |         |

(Continued)

FOREIGN PATENT DOCUMENTS

EP    0973136    1/2000

(Continued)

OTHER PUBLICATIONS

U.S. Appl. No. 09/764,991 to Sasaki et al., entitled "Data Storage Medium, Data Recording and Reproducing Method, and Data Recording and Reproducing Apparatus", filed on Jan. 23, 2001; and.

(Continued)

*Primary Examiner*—Mano Padmanabhan
*Assistant Examiner*—Paul Baker
(74) *Attorney, Agent, or Firm*—Greenblum & Bernstein, P.L.C.

(57) ABSTRACT

A file management method, whereby inconsistencies can be prevented between a file recorded in a memory card and the file management information that a terminal apparatus manages, without leaking the information of a file made and stored in an in-card processing system. According to this method, a flash memory accessible from two processing systems 100 and 300 is provided. First processing system 100 requests a reservation of an use area of flash memory 200a to second processing system 300, which, upon receiving the request, implements a reservation processing for an area of the memory section and reflects the information of the reserve area upon file management section 230. First processing system 100 performs the processing of writing data into the area reserved by second processing system 300. Inconsistencies between the file management information that a terminal manages and a file actually recorded into the memory section of a secure card can be prevented. Furthermore, exclusive control can be implemented, whereby there will be no direct access from a terminal to the area used for a card-dedicated file recorded therein by means of processing that takes place inside the card.

21 Claims, 31 Drawing Sheets

U.S. PATENT DOCUMENTS

| | | | |
|---|---|---|---|
| 5,491,827 A * | 2/1996 | Holtey | 711/163 |
| 5,638,530 A * | 6/1997 | Pawate et al. | 711/115 |
| 5,963,983 A * | 10/1999 | Sakakura et al. | 711/202 |
| 6,427,186 B1 * | 7/2002 | Lin et al. | 711/103 |
| 6,467,018 B1 * | 10/2002 | Dell et al. | 711/105 |
| 6,591,330 B1 * | 7/2003 | Lasser | 711/103 |
| 6,748,485 B1 * | 6/2004 | Yokota et al. | 711/112 |
| 2004/0236910 A1 * | 11/2004 | Kozakai et al. | 711/115 |

FOREIGN PATENT DOCUMENTS

| | | |
|---|---|---|
| JP | 8-95835 | 4/1996 |
| JP | 2001-243096 | 9/2001 |
| WO | 01/63419 | 8/2001 |

OTHER PUBLICATIONS

U.S. Appl. No. 10/108,454 to Tsurubayashi, entitled "Data Acquiring Apparatus, Downloading Server and Trigger Server", filed on Mar. 29, 2002.

English Language Abstract of JP 8-95835.

English Language Abstract of JP2001-243096.

* cited by examiner

FIG. 8A

| 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|
| 33 | 34 | 35 | 36 | 37 | 38 | 39 | 40 | 41 | 42 | 43 | -1 | 60 | 61 | 62 | 63 |
| 48 | 49 | 50 | 51 | 52 | 53 | 54 | 55 | 56 | 57 | 58 | 59 | 61 | 62 | 63 | -1 |
| 49 | 50 | 51 | 52 | 53 | 54 | 58 | 56 | 57 | 68 | 59 | 60 | 76 | 77 | 78 | 79 |
| 64 | 65 | 66 | 67 | 68 | 69 | 70 | 71 | 72 | 73 | 74 | 75 | 76 | 77 | 78 | -1 |
| 80 | 81 | 82 | 83 | 84 | 85 | 86 | 87 | 88 | 89 | 90 | 91 | 92 | 93 | 94 | 95 |
| 81 | 82 | 83 | 84 | 85 | 102 | | | | 105 | 106 | 107 | 90 | 93 | 94 | -1 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |

FIG. 8B

| name  | address | size | etc   |
|-------|---------|------|-------|
| file1 | 32      | 6144 | date,… |
| file2 | 48      | 8092 | date,… |
| file3 | 55      | 7660 | date,… |
| file4 | 80      | 9153 | date,… |

FIG.13A

| 32 | 33 | 34 | 35 | 36 | 37 | 38 | 39 | 40 | 41 | 42 | 43 | 44 | 45 | 46 | 47 |
|----|----|----|----|----|----|----|----|----|----|----|----|----|----|----|----|
| 33 | 34 | 35 | 36 | 37 | 38 | 39 | 40 | 41 | 42 | 43 | -1 | ... | ... | ... | ... |
| 48 | 49 | 50 | 51 | 52 | 53 | 54 | 55 | 56 | 57 | 58 | 59 | 60 | 61 | 62 | 63 |
| 49 | 50 | 51 | 52 | 53 | 54 | 58 | 56 | 57 | 68 | 59 | 60 | 61 | 62 | 63 | -1 |
| 64 | 65 | 66 | 67 | 68 | 69 | 70 | 71 | 72 | 73 | 74 | 75 | 76 | 77 | 78 | 79 |
| | | | | 69 | 70 | 71 | 72 | 73 | 74 | 75 | 76 | 77 | 78 | 79 | -1 |
| 80 | 81 | 82 | 83 | 84 | 85 | 86 | 87 | 88 | 89 | 90 | 91 | 92 | 93 | 94 | 95 |
| 81 | 82 | 83 | 84 | 85 | 102 | | | | | 91 | 92 | 93 | 94 | 95 | -1 |
| 96 | 97 | 98 | 99 | 100 | 101 | 102 | 103 | 104 | 105 | 106 | 107 | 108 | 109 | 110 | 111 |
| | | | | | | 103 | 104 | 105 | 106 | 107 | 90 | | | | |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |

FIG.13B

| name  | address | size | etc     |
|-------|---------|------|---------|
| file1 | 32      | 6144 | date,...|
| file2 | 48      | 8092 | date,...|
| file3 | 55      | 7660 | date,...|
| file4 | 80      | 9153 | date,...|

FIG.14A

| 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|
| 33 | 34 | 35 | 36 | 37 | 38 | 39 | 40 | 41 | 42 | 43 | -1 | 45 | 46 | 47 | 64 |
| 48 | 49 | 50 | 51 | 52 | 53 | 54 | 55 | 56 | 57 | 58 | 59 | 60 | 61 | 62 | 63 |
| 49 | 50 | 51 | 52 | 53 | 54 | 58 | 56 | 57 | 68 | 59 | 60 | 61 | 62 | 63 | -1 |
| 64 | 65 | 66 | 67 | 68 | 69 | 70 | 71 | 72 | 73 | 74 | 75 | 76 | 77 | 78 | 79 |
| 65 | 66 | 67 | 68 | 69 | 70 | 71 | 72 | 73 | 74 | 75 | 76 | 77 | 78 | 79 | -1 |
| 80 | 81 | 82 | 83 | 84 | 85 | 86 | 87 | 88 | 89 | 90 | 91 | 92 | 93 | 94 | 95 |
| 81 | 82 | 83 | 84 | 85 | 86 | 87 | 88 | 89 | 96 | 91 | 92 | 93 | 94 | 95 | -1 |
| 96 | 97 | 98 | 99 | 100 | 101 | 102 | 103 | 104 | 105 | 106 | 107 | 108 | 109 | 110 | 111 |
| 97 | -1 | 98 | 99 | 100 | 101 | 103 | 104 | 105 | 106 | 107 | 90 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |

FIG.14B

| name | address | size | etc |
|---|---|---|---|
| file1 | 32 | 6144 | date,··· |
| file2 | 48 | 8092 | date,··· |
| file3 | 55 | 7660 | date,··· |
| file4 | 80 | 9153 | date,··· |
| dummy1 | 44 | 7168 | date,··· |

FIG.18A

| 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|
| 33 | 34 | 35 | 36 | 37 | 38 | 39 | 40 | 41 | 42 | 43 | -1 | 45 | 46 | 47 | 64 |
| 48 | 49 | 50 | 51 | 52 | 53 | 54 | 55 | 56 | 57 | 58 | 59 | 60 | 61 | 62 | 63 |
| 49 | 50 | 51 | 52 | 53 | 54 | 58 | 56 | 57 | 68 | 59 | 60 | 61 | 62 | 63 | -1 |
| 64 | 65 | 66 | 67 | 68 | 69 | 70 | 71 | 72 | 73 | 74 | 75 | 76 | 77 | 78 | 79 |
| 65 | 66 | 67 | 86 | 69 | 70 | 71 | 72 | 73 | 74 | 75 | 76 | 77 | 78 | 79 | -1 |
| 80 | 81 | 82 | 83 | 84 | 85 | 86 | 87 | 88 | 89 | 90 | 91 | 92 | 93 | 94 | 95 |
| 81 | 82 | 83 | 84 | 85 | 102 | 87 | 88 | 89 | 96 | 91 | 92 | 93 | 94 | 95 | -1 |
| 96 | 97 | 98 | 99 | 100 | 101 | 102 | 103 | 104 | 105 | 106 | 107 | 108 | 109 | 110 | 111 |
| 97 | -1 | 99 | 100 | -1 | ... | 103 | 104 | 105 | 106 | 107 | 90 | ... | ... | ... | ... |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |

FIG.18B

| name | address | size | etc |
|---|---|---|---|
| file1 | 32 | 6144 | date,... |
| file2 | 48 | 8092 | date,... |
| file3 | 55 | 7660 | date,... |
| file4 | 80 | 9153 | date,... |
| dummy1 | 44 | 8704 | date,... |
| dummy2 | 98 | 1536 | date,... |

FIG.19A

| 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|
| 33 | 34 | 35 | 36 | 37 | 38 | 39 | 40 | 41 | 42 | 43 | -1 | 45 | 46 | 47 | 64 |
| 48 | 49 | 50 | 51 | 52 | 53 | 54 | 55 | 56 | 57 | 58 | 59 | 60 | 61 | 62 | 63 |
| 49 | 50 | 51 | 52 | 53 | 54 | 58 | 56 | 57 | 68 | 59 | 60 | 61 | 62 | 63 | -1 |
| 64 | 65 | 66 | 67 | 68 | 69 | 70 | 71 | 72 | 73 | 74 | 75 | 76 | 77 | 78 | 79 |
| 65 | 66 | 67 | 86 | 69 | 70 | 71 | 72 | 73 | 74 | 75 | 76 | 77 | 78 | 79 | -1 |
| 80 | 81 | 82 | 83 | 84 | 85 | 86 | 87 | 88 | 89 | 90 | 91 | 92 | 93 | 94 | 95 |
| 81 | 82 | 83 | 84 | 85 | 102 | 87 | 88 | 89 | 96 | 91 | 92 | 93 | 94 | 95 | -1 |
| 96 | 97 | 98 | 99 | 100 | -1 | 101 | 102 | 103 | 104 | 105 | 106 | 107 | 108 | 109 | 110 | 111 |
| 97 | 98 | 99 | 100 | -1 | 116 | 117 | 118 | 103 | 104 | 105 | 106 | 107 | 90 | 108 | 109 |
| 112 | 113 | 114 | 115 | 116 | 132 | 133 | 134 | 135 | 136 | 137 | 138 | 139 | 140 | 125 | 126 | 127 |
| 128 | 129 | 130 | 131 | 132 | 133 | 134 | 135 | 136 | 137 | 138 | 139 | 140 | 141 | 142 | 143 |

FIG.19B

| name | address | size | etc |
|---|---|---|---|
| file1 | 32 | 6144 | date,... |
| file2 | 48 | 8092 | date,... |
| file3 | 55 | 7660 | date,... |
| file4 | 80 | 9153 | date,... |
| dummy1 | 44 | 8704 | date,... |

FIG.20A

| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 45 | 46 | 47 | 
| 64 | 65 | 66 | 67 | 68 | 69 | 70 | 71 | 72 | 73 | 74 | 75 | 76 | 61 | 62 | 63 |
| 80 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 87 | 88 | 89 | 64 | | | | | | |
| 96 | 97 | 99 | 100 | -1 | | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |

FIG.20B

| name | address | size | etc |
|---|---|---|---|
| sfile1 | 86 | 7168 | date,··· |
| sfile-2 | 98 | 1536 | date,··· |

FIG.23A

| 32 | 33 | 34 | 35 | 36 | 37 | 38 | 39 | 40 | 41 | 42 | 43 | 44 | 45 | 46 | 47 |
|----|----|----|----|----|----|----|----|----|----|----|----|----|----|----|----|
| 33 | 34 | 35 | 36 | 37 | 38 | 39 | 40 | 41 | 42 | 43 | -1 | 45 | 46 | 47 | 64 |
| 48 | 49 | 50 | 51 | 52 | 53 | 54 | 55 | 56 | 57 | 58 | 59 | 60 | 61 | 62 | 63 |
| 49 | 50 | 51 | 52 | 53 | 54 | 55 | 56 | 57 | 58 | 59 | 60 | 61 | 62 | 63 | -1 |
| 64 | 65 | 66 | 67 | 68 | 69 | 70 | 71 | 72 | 73 | 74 | 75 | 76 | 77 | 78 | 79 |
| 65 | 66 | 67 | 68 | 69 | 70 | 71 | 72 | 73 | 74 | 75 | 76 | 77 | 78 | 79 | -1 |
| 80 | 81 | 82 | 83 | 84 | 85 | 86 | 87 | 88 | 89 | 90 | 91 | 92 | 93 | 94 | 95 |
| 81 | 82 | 83 | 84 | 85 | 86 | 87 | 88 | 89 | 90 | 91 | 92 | 93 | 94 | 95 | -1 |
| 96 | 97 | 98 | 99 | 100 | 101 | 102 | 103 | 104 | 105 | 106 | 107 | 108 | 109 | 110 | 111 |
| 97 | 98 | 99 | 100 | -1 | 101 | 102 | 103 | 104 | 105 | 106 | 107 | 90 | 108 | 109 | 110 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |

FIG.23B

| name | address | size | etc |
|------|---------|------|-----|
| file1 | 32 | 6144 | date,··· |
| file2 | 48 | 8092 | date,··· |
| file3 | 55 | 7660 | date,··· |
| file4 | 80 | 9153 | date,··· |
| dummy1 | 44 | 7168 | date,··· |

FIG.24A

| 32 | 33 | 34 | 35 | 36 | 37 | 38 | 39 | 40 | 41 | 42 | 43 | 44 | 45 | 46 | 47 |
| 33 | 34 | 35 | 36 | 37 | 38 | 39 | 40 | 41 | 42 | 43 | -1 | -2 | -2 | -2 | -2 |
| 48 | 49 | 50 | 51 | 52 | 53 | 54 | 55 | 56 | 57 | 58 | 59 | 60 | 61 | 62 | 63 |
| 49 | 50 | 51 | 52 | 53 | 54 | 58 | 56 | 57 | 68 | 59 | 60 | 61 | 62 | 63 | -1 |
| 64 | 65 | 66 | 67 | 68 | 69 | 70 | 71 | 72 | 73 | 74 | 75 | 76 | 77 | 78 | 79 |
| -2 | -2 | -2 | -2 | -2 | -2 | 71 | 72 | 73 | 74 | 75 | 76 | 77 | 78 | 79 | -1 |
| 80 | 81 | 82 | 83 | 84 | 85 | 86 | 87 | 88 | 89 | 90 | 91 | 92 | 93 | 94 | 95 |
| 81 | 82 | 83 | 84 | 85 | 102 | -2 | -2 | -2 | -2 | 91 | 92 | 93 | 94 | 95 | -1 |
| 96 | 97 | 98 | 99 | 100 | 101 | 102 | 103 | 104 | 105 | 106 | 107 | 108 | 109 | 110 | 111 |
| -2 | -2 | -2 | -2 | -2 | 117 | 103 | 104 | 105 | 106 | 107 | 90 | | | | |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |

FIG.24B

| name | address | size | etc |
|------|---------|------|-----|
| file1 | 32 | 6144 | date,… |
| file2 | 48 | 8092 | date,… |
| file3 | 55 | 7660 | date,… |
| file4 | 80 | 9153 | date,… |

| 44 | 45 | 46 | 47 |
|---|---|---|---|
| dummy1.dmy,13 | Data | Data | Data |
| 64 | 65 | 66 | 67 |
| Data | Data | Data | Data |
| 86 | 87 | 88 | 89 |
| Data | Data | Data | Data |
| 96 | 97 | 98 | 99 |
| Data | Data | Null | Null |
| 100 | | | |
| Null | | | |

FIG.26A

| 44 | 45 | 46 | 47 |
|---|---|---|---|
| dummy1.dmy,11 | Data | Data | Null |
| 64 | 65 | 66 | 67 |
| Data | Data | Data | Data |
| 86 | 87 | 88 | 89 |
| Data | Null | Data | Data |
| 96 | 97 | 98 | 99 |
| Data | Data | Null | Null |
| 100 | | | |
| Null | | | |

FIG.26B

| 44 | 45 | 46 | 47 |
|---|---|---|---|
| dummy1.dmy,0 | Null | Null | Null |
| 64 | 65 | 66 | 67 |
| Null | Null | Null | Null |
| 86 | 87 | 88 | 89 |
| Null | Null | Null | Null |
| 96 | 97 | 98 | 99 |
| Null | Null | Null | Null |
| 100 | | | |
| Null | | | |

| 32 | 33 | 34 | 35 | 36 | 37 | 38 | 39 | 40 | 41 | 42 | 43 | 44 | 45 | 46 | 47 |
|----|----|----|----|----|----|----|----|----|----|----|----|----|----|----|----|
|    |    |    |    |    |    |    |    |    |    |    |    | -1 | 88 | 45 | 87 |
|    |    |    |    |    |    |    |    |    |    |    |    | 44 | 44 | 44 | 44 |

| 48 | 49 | 50 | 51 | 52 | 53 | 54 | 55 | 56 | 57 | 58 | 59 | 60 | 61 | 62 | 63 |
|----|----|----|----|----|----|----|----|----|----|----|----|----|----|----|----|

| 64 | 65 | 66 | 67 | 68 | 69 | 70 | 71 | 72 | 73 | 74 | 75 | 76 | 77 | 78 | 79 |
|----|----|----|----|----|----|----|----|----|----|----|----|----|----|----|----|
| 96 | 46 | 67 | 47 |    |    |    |    |    |    |    |    |    |    |    |    |
| 44 | 44 | 44 | 44 |    |    |    |    |    |    |    |    |    |    |    |    |

| 80 | 81 | 82 | 83 | 84 | 85 | 86 | 87 | 88 | 89 | 90 | 91 | 92 | 93 | 94 | 95 |
|----|----|----|----|----|----|----|----|----|----|----|----|----|----|----|----|
|    |    |    |    |    |    | 89 | -1 | 66 | 64 |    |    |    |    |    |    |
|    |    |    |    |    |    | 44 | 44 | 44 | 44 |    |    |    |    |    |    |

| 96 | 97 | 98 | 99 | 100 | 101 | 102 | 103 | 104 | 105 | 106 | 107 | 108 | 109 | 110 | 111 |
|----|----|----|----|-----|-----|-----|-----|-----|-----|-----|-----|-----|-----|-----|-----|
| 97 | 65 | 0  | 0  | 0   |     |     |     |     |     |     |     |     |     |     |     |
| 44 | 44 | 44 | 44 | 44  |     |     |     |     |     |     |     |     |     |     |     |

FIG.29B

| name   | address | size | etc      |
|--------|---------|------|----------|
| sfile3 | 86      | 6650 | date,··· |

(X)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 528 | 0 | 1 | 2 | 3 | 4 | 5 | 6 | 7 | 8 | 9 | 10 | 11 | 12 | 13 | 14 | 15 |
|     | 16 | 17 | 18 | 19 | 20 | 21 | 22 | 23 | 24 | 25 | 26 | 27 | 28 | 29 | 30 | 31 |
| 530 | 32 | 33 | 34 | 35 | 36 | 37 | 38 | 39 | 40 | 41 | 42 | 43 | 44 | 45 | 46 | 47 |
|     | 48 | 49 | 50 | 51 | 52 | 53 | 54 | 55 | 56 | 57 | 58 | 59 | 60 | 61 | 62 | 63 |
| 521 | 64 | 65 | 66 | 67 | 68 | 69 | 70 | 71 | 72 | 73 | 74 | 75 | 76 | 77 | 78 | 79 |
|     | 80 | 81 | 82 | 83 | 84 | 85 | 86 | 87 | 88 | 89 | 90 | 91 | 92 | 93 | 94 | 95 |
| 525 | 96 | 97 | 98 | 99 | 100 | 101 | 102 | 103 | 104 | 105 | 106 | 107 | 108 | 109 | 110 | 111 |
|     | 112 | 113 | 114 | 115 | 116 | 117 | 118 | 119 | 120 | 121 | 122 | 123 | 124 | 125 | 126 | 127 |
| 532 | 128 | 129 | 130 | 131 | 132 | 133 | 134 | 135 | 136 | 137 | 138 | 139 | 140 | 141 | 142 | 143 |
|     | 144 | 145 | 146 | 147 | 148 | 149 | 150 | 151 | 152 | 153 | 154 | 155 | 156 | 157 | 158 | 159 |
| 622 | 160 | 161 | 162 | 163 | 164 | 165 | 166 | 167 | 168 | 169 | 170 | 171 | 172 | 173 | 174 | 175 |
|     | 176 | 177 | 178 | 179 | 180 | 181 | 182 | 183 | 184 | 185 | 186 | 187 | 188 | 189 | 190 | 191 |
| 626 | 192 | 193 | 194 | 195 | 196 | 197 | 198 | 199 | 200 | 201 | 202 | 203 | 204 | 205 | 206 | 207 |
|     | 208 | 209 | 210 | 211 | 212 | 213 | 214 | 215 | 216 | 217 | 218 | 219 | 220 | 221 | 222 | 223 |
| 629 | 224 | 225 | 226 | 227 | 228 | 229 | 230 | 231 | 232 | 233 | 234 | 235 | 236 | 237 | 238 | 239 |
|     | 240 | 241 | 242 | 243 | 244 | 245 | 246 | 247 | 248 | 249 | 250 | 251 | 252 | 253 | 254 | 255 |
| 523 | 256 | 257 | 258 | 259 | 260 | 261 | 262 | 263 | 264 | 265 | 266 | 267 | 268 | 269 | 270 | 271 |
|     | 272 | 273 | 274 | 275 | 276 | 277 | 278 | 279 | 280 | 281 | 282 | 283 | 284 | 285 | 286 | 287 |
| 533 | 288 | 289 | 290 | 291 | 292 | 293 | 294 | 295 | 296 | 297 | 298 | 299 | 300 | 301 | 302 | 303 |
|     | 304 | 305 | 306 | 307 | 308 | 309 | 310 | 311 | 312 | 313 | 314 | 315 | 316 | 317 | 318 | 319 |
| 527 | 320 | 321 | 322 | 323 | 324 | 325 | 326 | 327 | 328 | 329 | 330 | 331 | 332 | 333 | 334 | 335 |
|     | 336 | 337 | 338 | 339 | 340 | 341 | 342 | 343 | 344 | 345 | 346 | 347 | 348 | 349 | 350 | 351 |
| 531 | 352 | 353 | 354 | 355 | 356 | 357 | 358 | 359 | 360 | 361 | 362 | 363 | 364 | 365 | 366 | 367 |
|     | 368 | 369 | 370 | 371 | 372 | 373 | 374 | 375 | 376 | 377 | 378 | 379 | 380 | 381 | 382 | 383 |
| 534 | 384 | 385 | 386 | 387 | 388 | 389 | 390 | 391 | 392 | 393 | 394 | 395 | 396 | 397 | 398 | 399 |
|     | 400 | 401 | 402 | 403 | 404 | 405 | 406 | 407 | 408 | 409 | 410 | 411 | 412 | 413 | 414 | 415 |
| 524 | 416 | 417 | 418 | 419 | 420 | 421 | 422 | 423 | 424 | 425 | 426 | 427 | 428 | 429 | 430 | 431 |
|     | 432 | 433 | 434 | 435 | 436 | 437 | 438 | 439 | 440 | 441 | 442 | 443 | 444 | 445 | 446 | 447 |
| 535 | 448 | 449 | 450 | 451 | 452 | 453 | 454 | 455 | 456 | 457 | 458 | 459 | 460 | 461 | 462 | 463 |
|     | 464 | 465 | 466 | 467 | 468 | 469 | 470 | 471 | 472 | 473 | 474 | 475 | 476 | 477 | 478 | 479 |
| 536 | 480 | 481 | 482 | 483 | 484 | 485 | 486 | 487 | 488 | 489 | 490 | 491 | 492 | 493 | 494 | 495 |
|     | 496 | 497 | 498 | 499 | 500 | 501 | 502 | 503 | 504 | 505 | 506 | 507 | 508 | 509 | 510 | 511 |

FIG.30A

| name | address | size | etc |
|---|---|---|---|
| sfile1 | 322 | 7168 | date,··· |
| sfile2 | 620 | 1536 | date,··· |

FIG.30B

CONNECTION INFORMATION NUMBER HELD PER EXT-FAT CLUSTER:
　　32 CLUSTER

EXT-FAT ORDER INFORMATION:
　(1ST CLUSTER NUMBER: : 2ND CLUSTER NUMBER:3RD CLUSTER NUMBER:....)
　528.530.521.525.532.522.526.529.523.533.527.531.534.···

EXT DIRECTORY ENTRY INFORMATION:
　　TOP ADDRESS

FIG.31

FILE MANAGEMENT METHOD, AND MEMORY CARD AND TERMINAL APPARATUS THAT MAKE USE OF THE METHOD

BACKGROUND OF THE INVENTION

1. Field of the Invention

The present invention relates to file management methods, and memory card and terminal apparatus, whereby, in particular, inconsistencies between files actually recorded in memory card and the file management information thereof can be prevented.

2. Description of the Related Art

In recent years IC cards have come in use for commuter passes, telephone cards, cash cards, and such. Likewise, memory cards have been in use as a memory medium for personal computers (PC), digital cameras, music players, and such. Both cards are thus in use for various purposes.

Memory cards are used with the purpose of supplementing built-in memory areas in digital cameras and music players and such, and for portability. For instance, by storing the electronic data of the pictures taken with a digital camera into an installed memory card and by installing this memory card in a PC, these pictures can be viewed on the PC.

On the other hand, as shown in FIG. 1, IC card 20, which incorporates a memory and a CPU, comprises memory section 22 that consists essentially of an information-writable/readable IC memory and in-card processing system 21 that consists essentially of a CPU that is connected to memory section 22 by way of interface (I/F) 23 and that controls data writing/reading with respect to memory section 22. In-card processing system 21 assumes the file management of memory section 22. Furthermore, when writing data into or reading data from IC card 20, terminal 10 sends a writing or reading request to in-card processing system 21 via communication sections 11 and 24 and, by way in-card processing system 21, writes data into or reads data from memory section 22.

Then, in-card processing system 21, upon verifying that this terminal 10 is a terminal legitimately qualified for processing the data stored in memory section 22, responds to a writing request or a reading request from terminal 10. So if the card is a cash card, access to the data stored in the card will be denied with the exception of bank terminals, so that the security of the data stored in the card is preserved.

While IC cards that maintain the security of stored data by verifying the terminals are in use, lately, in order for users not to carry several cards, the development of multi-functional memory cards that incorporate IC-card functions and that by one can be used for various purposes have been in progress.

This card (hereinafter called "secure card") comprises, as shown in FIG. 2, memory section 32 and in-card processing system 31 that is connected to memory section 32 by way of interface (I/F) 33 and that controls data writing/reading with respect to memory section 32. However, it is also possible that terminal 10 holds direct access to memory section 32 by way of interface (I/F) 34.

When terminal 10 directly accesses memory section 32 of secure card 30, this unlike aforementioned IC card 20 does not require verification, and so any terminal 10 is able to read data out. Although in accordance with the developing versatility of the cards, this makes it difficult to preserve data security, and so there is a need for a scheme whereby direct access to the data that requires confidentiality will be disallowed.

For such scheme, a system is under consideration in which in-card processing system 31 manages the files of highly confidential data without disclosing the file management information to terminal 10 at all, and whereby terminal 10 verified by in-card processing system 31 alone performs data writing/reading with respect to these files via in-card processing system 31, while the file management information of the files regarding the data without high confidentiality is disclosed to terminal 10 and terminal 10 directly performs writing/reading with respect to these files.

For a secure card that employs such system, the range of use would be broad. That is, it is applicable to memory cards for PCs, digital cameras, audio/video players and such, electronic bankbooks and cash cards for use with bank terminals, credit cards and debit cards for use with shop terminals, and to the cards for electronic money payment, for receiving and keeping electronic receipts, and for recording use history. Moreover, it is possible to accumulate music distribution contents and pay the fees by the in-card credit/debit and such payment function.

Of the above range of use, however, taking all the trouble to verify a user, for instance when using a secure card as a memory card for a PC or for a digital camera, only adds to inconvenience. So, upon such use, direct access by terminal 10 to a card's memory section 32 is tolerated.

Nevertheless, if an electronic receipt issued at a certain shop can be freely viewed at other shops, or if the content of an electronic bankbook can be read through other shop terminals, this is a problem from the viewpoint of privacy protection. For this reason, in-card processing system 31 of secure card 30 performs file management in such a way that electronic receipt information can be viewed only by the holder or the issuing shop and an electronic bankbook can be accessed only through bank terminals.

Regarding the example of music distribution, a decrypting key for decrypting the encrypted contents is stored in memory section 32 via in-card processing system 31 in order not to be taken out illegitimately, and meanwhile the actual body of the encrypted contents, meaningless without a decrypting key, is kept by means of direct access to memory section 32.

FIG. 3 shows in a frame format the data writing that terminal 10 performs through direct access to memory 32 of secure card 30, and the data writing that in-card processing system 31 of secure card 30 performs. Incidentally, although for file management systems the FAT file system that uses the FAT (File Allocation Table), NTFS (Windows (registered trademark) NT File System), UFS (Unix (registered trademark) File System) and such are known, the present document will describe cases with FAT.

In FIG. 3, secure card 30 comprises memory section 32, in which a directory entry and FAT 33 for file management are recorded as file management information, and in-card processing system 31. Terminal 10 comprises terminal processing system 11 that controls direct access to memory section 32, and terminal cache memory 12 that memorizes data on a temporary basis.

When secure card 30 is installed in terminal 10 and access to secure card 30 from terminal 10 starts, first, the directory entry and FAT 33 recorded in memory section are read out to terminal cache memory 12 (41). The read-out directory entry and FAT are termed FAT 13 in FIG. 3. Terminal processing system 11, when writing data (DAT 2) into memory section 32 of secure card 30, adds the file management information of DAT 2 to FAT 13 (42) and at the same time writes DAT 2 into cache memory 12 (43). Cache memory 12, when the right moment comes, writes FAT 13 over FAT 33 (44) and at the same time stores DAT 2 into memory section 32 in accordance with the file management information recorded in FAT 13 (45).

On the other hand, in-card processing system 31 of secure card 30, when writing data (DAT 1) into memory section 32 of secure card 30, adds the file management information of DAT 1 to the directory entry and FAT 34 that are for the file management of its own (46) and at the same time stores DAT 1 into memory section 32 in accordance with the file management information recorded in FAT 34 (47).

As with the aforementioned example of music distribution, there is a possibility that storing a decrypting key (corresponding to DAT 1) into memory section 32 by in-card processing system 31, and storing the actual body of encrypted contents (corresponding to DAT 2) into memory section 32 by terminal processing system 11 are performed virtually at the same time.

As shown in FIG. 4, in-card processing system 31 is capable also of storing a directory entry and an FAT used for the file management of its own into memory section 32 as an EXT-directory and EXT-FAT 35, which are extension file management information.

In the case of this secure card, however, the file management information (that is, FAT 33 and FAT 13) of memory section 32 that terminal processing system 11 is able to learn does not contain the file management information (that is, FAT 34) managed by in-card processing system 31. Consequently, as shown for instance in FIG. 5, there is a threat that terminal processing system 11 designates the area where DAT 1 is stored by in-card processing system 31 for an storage area for DAT 2 by means of FAT 13.

Even when in-card processing system 31 adds and updates the information relating to the DAT 1-written area to FAT 33, terminal 10 refers to FAT 13 that is read out to terminal cache memory 12 and so is unable to learn the writing area of DAT 1. Moreover, by the overwriting of FAT 33 with FAT 13, the content of FAT 33 updated by in-card processing system 31 will be invalid.

In such case, if DAT 2 is written according to the file management information of FAT 13 updated by terminal processing system 11, this will result to delete DAT 1.

Such situation results when file management information (FAT 13) managed by a terminal is not in consistency (i.e., inconsistency) with the state of the files actually recorded in memory section 32.

In order to prevent such file management information inconsistency, in respect to the SAN (Storage Area Network) whereby several hosts share a memory device, a method has been employed whereby a server manages file management information all by itself. According to this method, each client that stores information in a shared memory device tells a file name and size and such to the server and requests a reservation of a data area and, upon being notified of a reserve area from the server, stores data in the designated area and thereafter tells the file composition information to the server.

However, when this method is applied to a secure card, given that a secure card is a removable medium, the apparatus that is equivalent to the SAN server differs depending on the circumstances, and consequently, the file management information managed by in-card processing system 31 will be known to an unlimited number of terminals, which makes it difficult to preserve the security of data.

SUMMARY OF THE INVENTION

An object of the present invention is to provide file management methods that can, without leaking the information of the files made and stored in an in-card processing system, prevent inconsistencies between files recorded in a memory card and the file management information that is to be managed by terminals, and memory cards and terminals for use with the above methods.

According to an aspect of the invention, a file management method is for use with a memory card having a memory section accessible from a first processing system and a second processing system. The file management method comprises a requesting step where the first processing system requests the second processing system for a reservation of an area of the memory section, a reservation step where the second processing system upon receiving a request in the requesting step implements a reserving processing for an area of the memory section, a reflection step where the second processing system reflects information of the area reserved in the reservation step upon file management information, a writing step where the first processing system performs a writing processing of data into the area reserved by the second processing system in the reservation step, and the first file processing system does not notify the file management information that results from the writing processing to the second processing system.

According to another aspect of the invention, a file management method is for use with a memory card having a memory section accessible from a first processing system and a second processing system. The file management method comprises a requesting step where the first processing system requests the second processing system for a reservation of an area of the memory section, a reservation step where the second processing system upon receiving a request from the first processing system implements a processing for reserving an area of the memory section, a reflection step where the second processing system reflects information of the area reserved in the reservation step upon file management information for the second processing system, and a writing step where the first processing system performs a writing processing of data of a file management system for the first processing system into the area reserved by the second processing system in the reservation step.

According to still another aspect of the invention, a file management method is for use with a memory card having a memory section accessible from a first processing system and a second processing system. The file management method comprises a requesting step where the first processing system requests the second processing system for a reservation of an area of the memory section, a reservation step where the second processing system upon receiving a request from the first processing system implements a processing for reserving an area of the memory section, a reflection step where the second processing system reflects information of the area reserved in the reservation step upon file management information for the second processing system, and a writing step where the first processing system performs a writing processing of data of a file management system for the first processing system into the area reserved by the second processing system in the reservation step. The first processing system does not notify file management information that results from the writing processing to the second processing system.

According to a further aspect of the invention, a terminal apparatus accesses a memory section of a memory card to perform file management. The terminal apparatus comprises a request receiving section that receives a request for a reservation of an area of the memory section from a processing system inside the memory card, an area reservation section that performs a processing for reserving an area of the memory section based upon the request received in the request receiving section, a file information processing section that reflects information of the area reserved by the area reservation section upon file management information for the terminal apparatus, and a reserve area transmitting section that transmits information of the area reserved by the area reservation section to the processing system inside the memory card.

According to a still further aspect of the invention, a memory card has a memory section accessible from a processing system inside the memory card and from a processing system in a terminal apparatus. The processing system inside the memory card comprises an area reservation request section that specifies a size and requests an reservation of an area of the memory section to the processing system in the terminal apparatus, a reserve area receiving section that receives a notification of a reserve area from the processing system in the terminal apparatus, a writing section that performs a writing processing of data into the reserve area of the memory section, and a writing location information storage section that stores writing location information of the data written in the reserve area in a state where the processing system inside the memory card alone is able to refer to the stored information.

According to a yet further aspect of the invention, a memory card has a memory section accessible from a processing system inside the memory card and from a processing system in a terminal apparatus. The processing system inside the memory card comprises an area reservation request section that specifies a size and requests an reservation of an area of the memory section to the processing system in the terminal apparatus, a reserve area receiving section that receives a notification of a reserve area from the processing system in the terminal apparatus, a vacant area memorizing section that memorizes the reserve area and that memorizes a vacant area that is left after a writing area is specified in the memorized reserve area, a writing section that performs a writing processing of data into the writing area specified by the vacant area memorizing section, and a writing location information storage section that stores writing location information of the data written in the writing area in a state where the processing system inside the memory card alone is able to refer to the stored information.

According to yet further aspect of the invention, a computer program is for a terminal apparatus that accesses a memory section of a memory card and performs file management. With this computer program, a computer will implement a request accepting procedure for accepting a request for an reservation of an area of the memory section from the memory card, an area reservation procedure for reserving an area of the memory section based on the request received in the request accepting procedure, a file information processing procedure for reflecting information of the area reserved in the area reservation procedure upon file management information for the computer, and a reserve area notifying procedure for notifying information of the area reserved in the area reservation procedure to the memory card.

According to a yet further aspect of the invention, a computer program is for a memory card having a memory section accessible from a processing system in the memory card and from a processing system in a terminal apparatus. With this computer program, a computer will implement an area reservation request procedure for specifying an size and requesting an reservation of an area of the memory section to the terminal apparatus, a reserve area receiving procedure for receiving a notification of a reserve area from the terminal apparatus, a data writing procedure for writing data into the reserve area of the memory section, a writing location information writing procedure for writing information of a writing location of the data written in the reserve area into the already reserved area of the memory section, and a writing area recording procedure for recording a storage location where the information of the writing location is written.

According to a yet further aspect of the invention, a computer program is for a memory card having a memory section accessible from a processing system in a card and from a terminal apparatus. With this computer program, a computer will implement an area reservation request procedure for specifying an size and requesting an reservation of an area of the memory section to the terminal apparatus, a reserve area receiving procedure for receiving a notification of a reserve area from the terminal apparatus, a data writing procedure for writing data into a writing area selected from the reserve area, a writing location information writing procedure for writing information of a writing location of the data written in the writing area into the already reserved area of the memory section, a writing area recording procedure for recording a storage location where the information of the writing location is written.

With the present invention, inconsistencies can be prevented between the files actually recorded in the memory section of a memory card and the file management information that a terminal apparatus manages, and exclusive control can be implemented whereby there will be no direct access from a terminal to the area used for a card-dedicated file recorded therein by means of processing that takes place inside the card.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 8A shows a sample FAT;

FIG. 8B shows a sample directory entry;

FIG. 13A shows a sample FAT according to Embodiment 1;

FIG. 13B shows a sample directory entry according to Embodiment 1;

FIG. 14A shows a sample FAT according to Embodiment 1 in a state where a dummy file is made;

FIG. 14B shows a sample directory entry according to Embodiment 1 in a state where a dummy file is made;

FIG. 18A shows a sample FAT according to Embodiment 1 in a state where a dummy file is newly provided, FIG. 18B shows a sample directory entry according to Embodiment 1 in a state where a dummy file is newly provided;

FIG. 19A shows a sample FAT according to Embodiment 1 in a state where a dummy file is appended;

FIG. 19B shows a sample directory entry according to Embodiment 1 in a state where a dummy file is appended;

FIG. 20A shows a sample EXT-FAT according to Embodiment 1;

FIG. 20B shows a sample EXT directory entry according to Embodiment 1;

FIG. 23A shows a sample FAT according to Embodiment 1 in a state where a portion of a dummy file is released;

FIG. 23B shows a sample directory entry according to Embodiment 1 in a state where a portion of a dummy file is released;

FIG. 24A shows a sample FAT according to Embodiment 1 in which reserve areas are made defect sectors;

FIG. 24B shows a sample directory entry according to Embodiment 1 in which reserve areas are made defect sectors;

FIG. 26A shows an example of data held in a vacant area memorizing section according to Embodiment 2;

FIG. 26B shows another example of data held in a vacant area memorizing section according to Embodiment 2;

FIG. 26C shows still another example of information held in a vacant area memorizing section according to Embodiment 2;

FIG. 29A shows a sample EXT-FAT according to Embodiment 2;

FIG. 29B shows a sample EXT directory entry according to Embodiment 2;

FIG. 30A shows another sample EXT-FAT according to Embodiment 2;

FIG. 30B shows another sample EXT directory entry according to Embodiment 2; and FIG. 31 shows an example of data held in a management information search section, according to Embodiment 2.

DESCRIPTION OF THE PREFERRED EMBODIMENT

The embodiment of the present invention will be described below with reference to the accompanying drawings.

Embodiment 1

Figure 1:
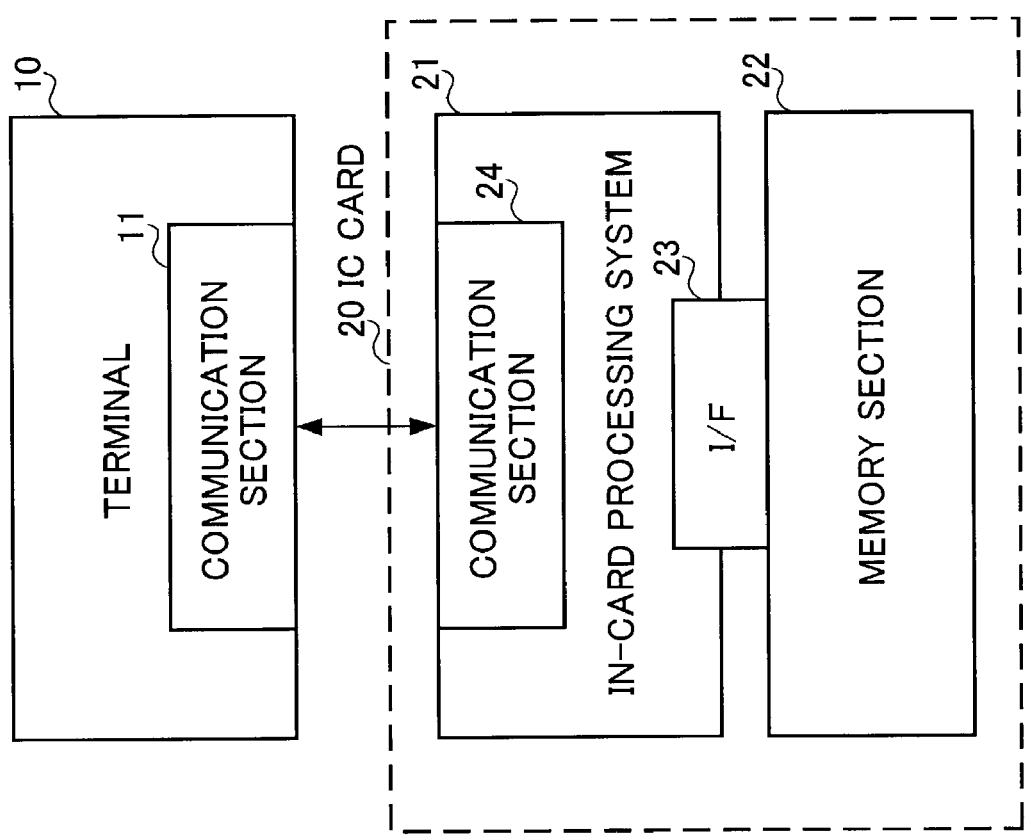
FIG. 1 shows a sample configuration of an IC card.
Figure 2:
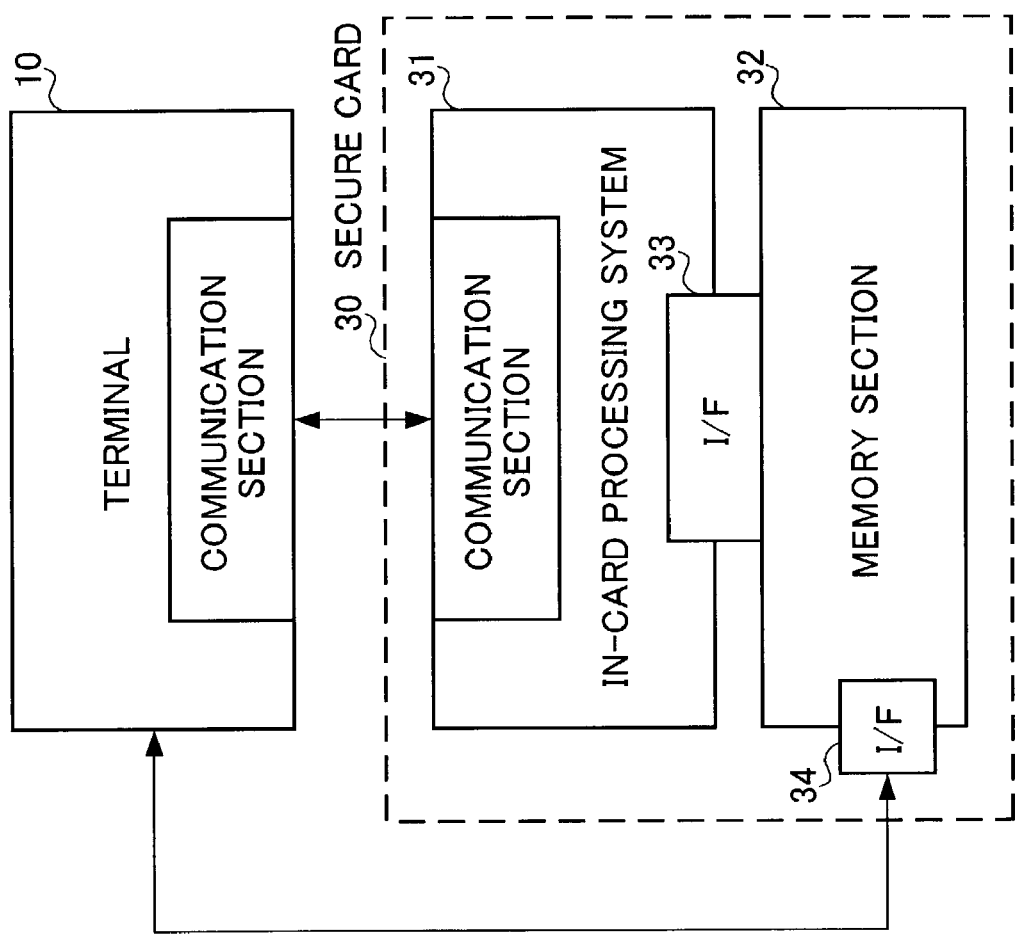
FIG. 2 shows a sample configuration of a secure card.
Figure 3:
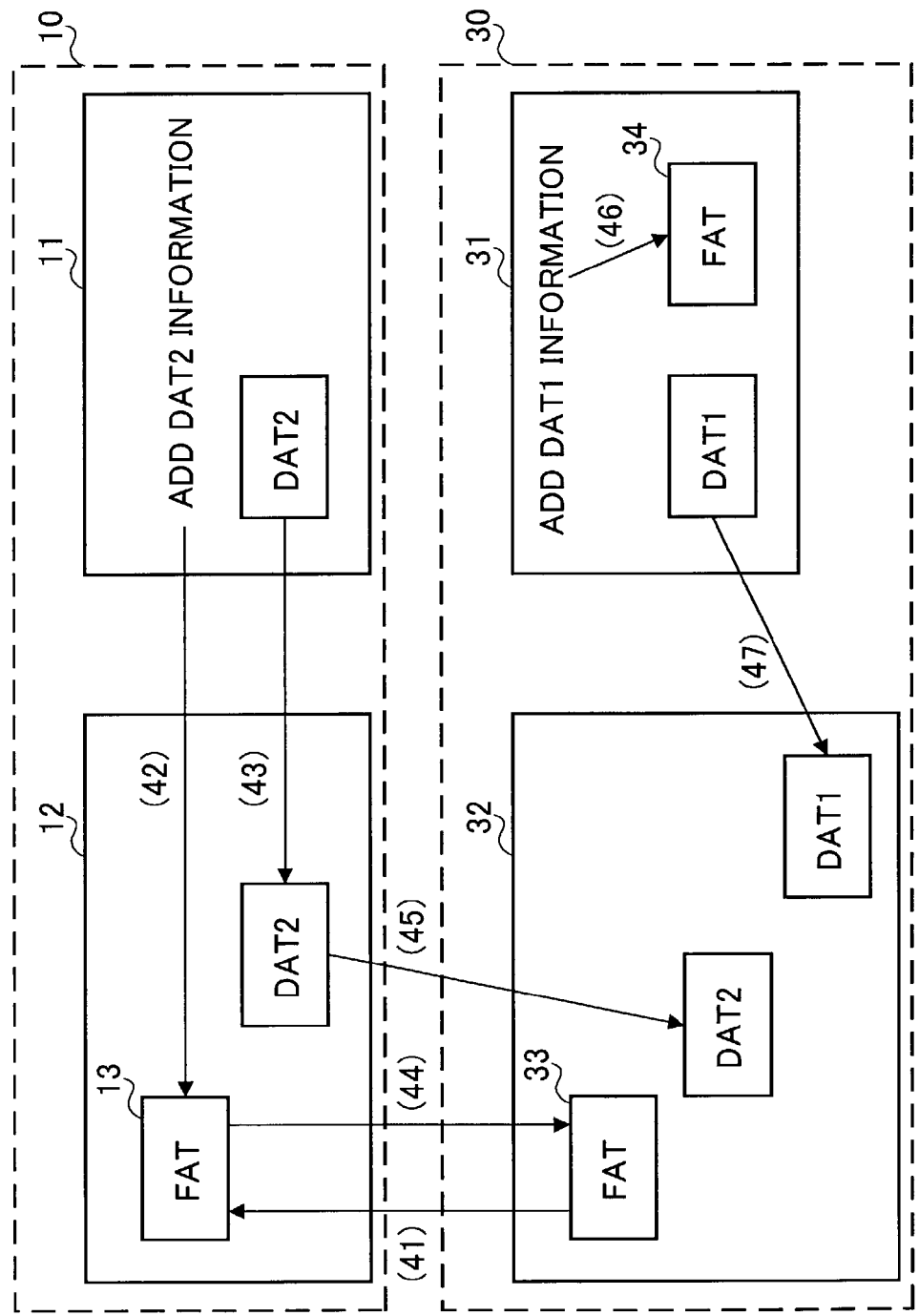
FIG. 3 shows an example of data writing processing into a secure card.
Figure 4:
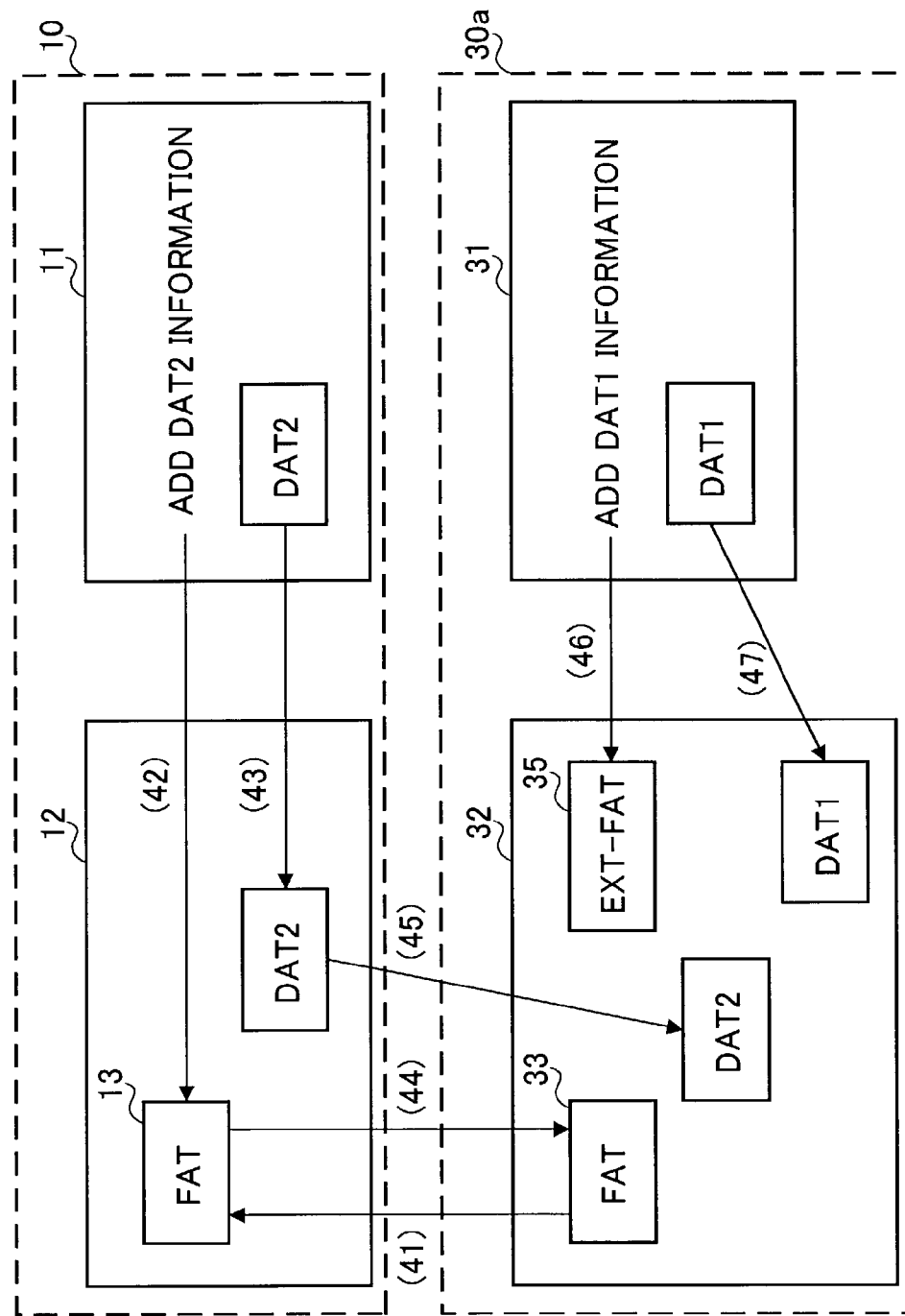
FIG. 4 shows another example of data writing processing into a secure card.
Figure 5:
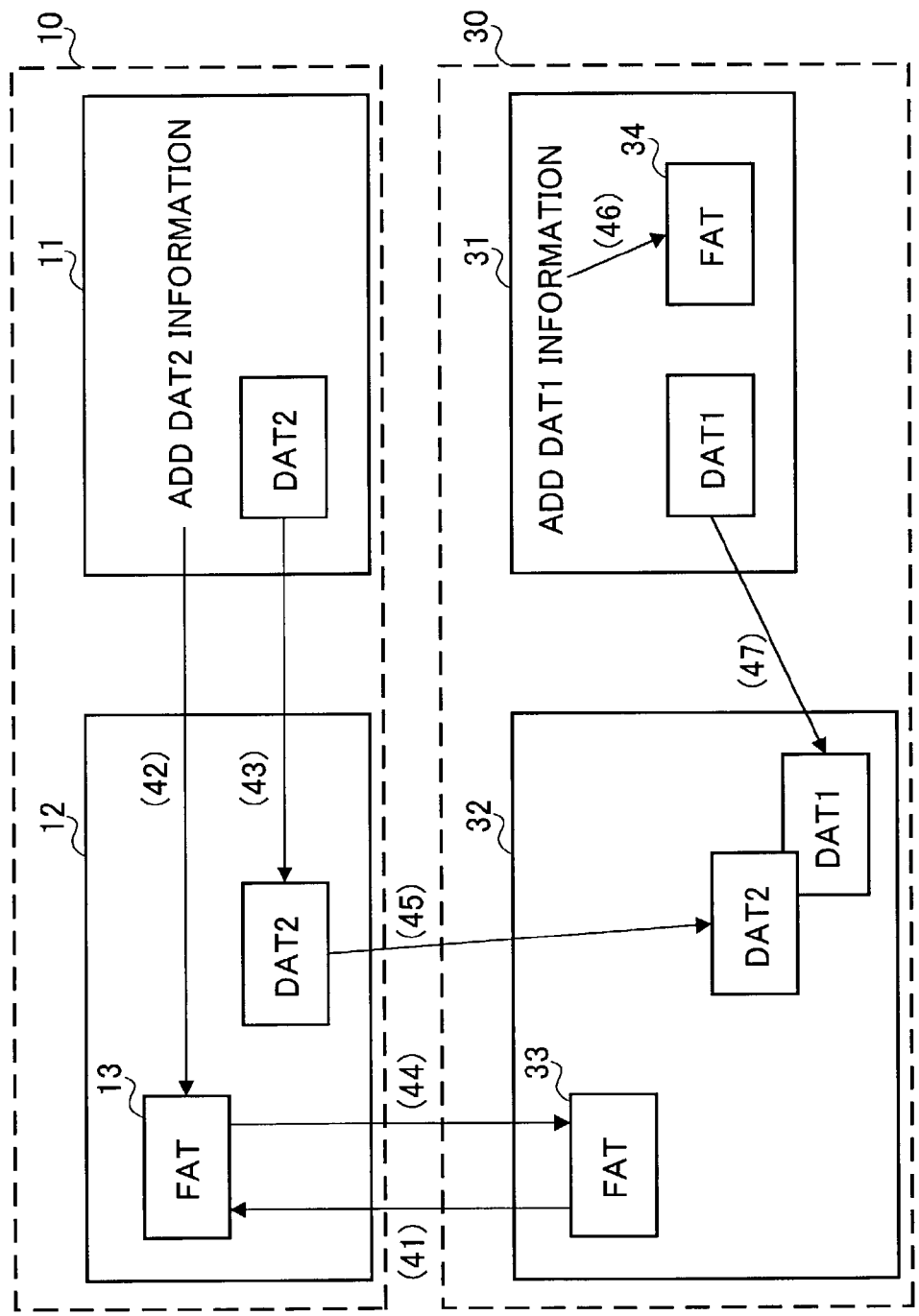
FIG. 5 illustrates a problem with a secure card.
Figure 6:
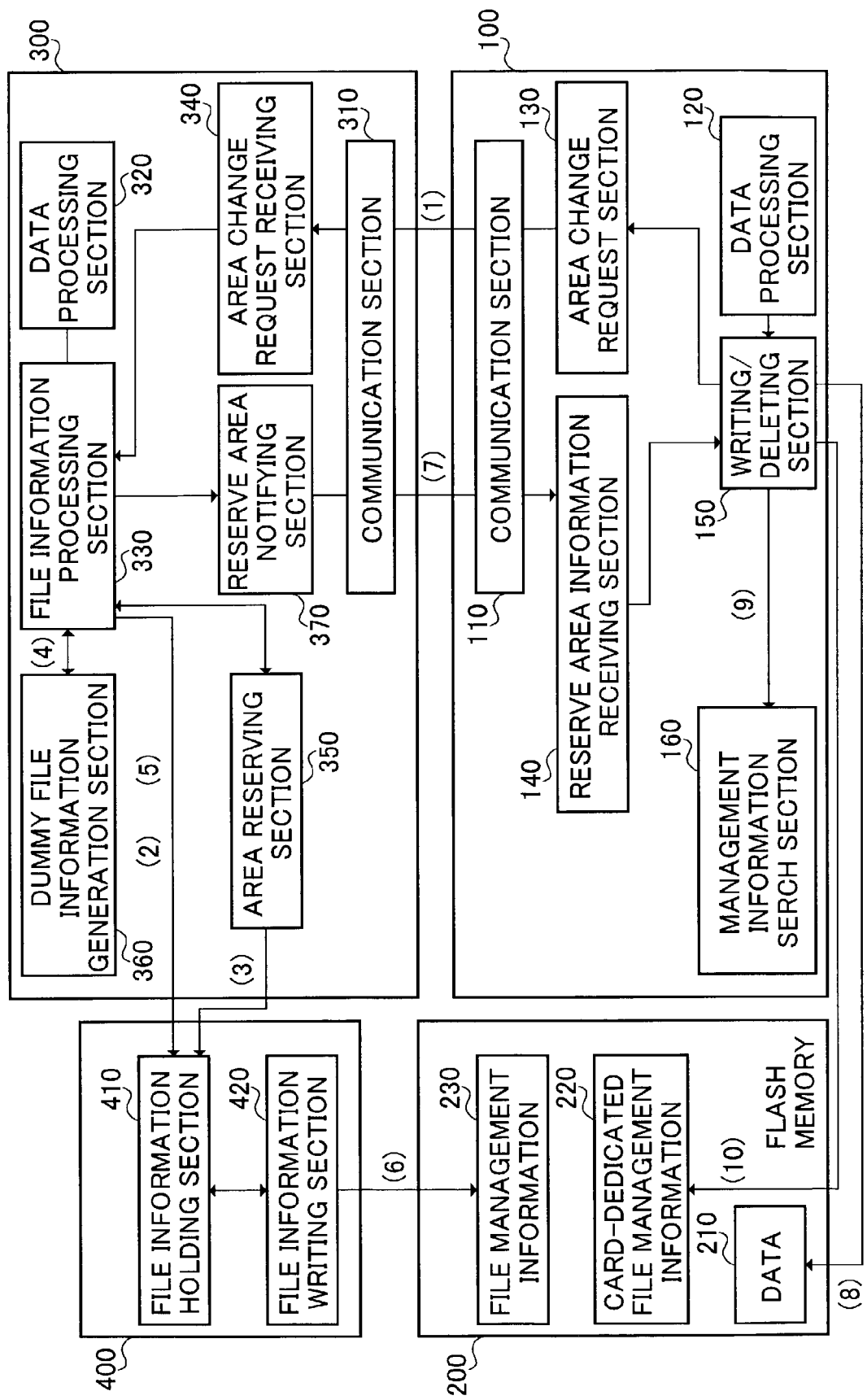
FIG. 6 shows a configuration of a secure card and of a terminal apparatus according to Embodiment 1 in a block diagram.

FIG. 6 is a block diagram showing a configuration of a secure card and of a terminal apparatus according to Embodiment 1 of the present invention.

As shown in FIG. 6, a secure card according to Embodiment 1 of the present invention comprises in-card processing system 100 that can be implemented by an application program installed in the card and flash memory 200 (memory section). In-card processing system 100 comprises communication section 110 for communication with terminal apparatus, data processing section 120 that processes data, area change request section 130 that notifies data size to the terminal apparatus and requests changes such as a reservation and a release of use area of flash memory 200, reserve area information receiving section 140 that receives information of the reserve area from the terminal apparatus, writing/deletion section 150 that performs the writing/deletion of actual data 210 of card-dedicated files into/from flash memory 200 and the writing of card-dedicated file management information 220, and management information search section 160 that holds the storage location information of card-dedicated file management information 220 which is written in flash memory 200. Stored in flash memory 200 are file management information 230 and the actual data of the files that every terminal apparatus can refer to, actual data 210 of the card-dedicated files that in-card processing system 100 alone can refer to, and file management information 220 of the card-dedicated files. In this text, the file management information of a card-dedicated file refers to the file management information for in-card processing system 100, one that stores the information of the files that in-card processing system 100 reads and writes. Moreover, in this specification, the file management information for a certain processing system does not relate to a processing system that rewrites file management information itself or to the location where file management information is stored, but refers to the file management information for a processing system that reads and writes into the files managed under the file management information in question.

Incidentally, card-dedicated file management information 220, writing/deletion section 150 that records/deletes this file management information 220, and management information search section 160 that holds the storage location information pertaining to card-dedicated file management information 220 constitute a "writing location information storage section" that holds the writing location of data 210 written into the reserve area in such a state that reference can be made from in-card processing system 100 alone. Furthermore, actual data 210 of a card-dedicated file which in-card processing system 100 alone can refer to and file management information 220 of the card-dedicated file constitute the "file management system" of in-card processing system 100.

Furthermore, as shown in FIG. 6, a terminal apparatus according to the present embodiment has terminal processing system 300 and cache memory 400. Terminal processing system 300 comprises communication section 310 for communication with in-card processing system 100, data processing section 320 that processes data, file information processing section 330 that performs update processing upon the file management information for terminal processing system 300 held in cache memory 400, area change request receiving section 340 that receives an area reservation request from in-card processing system 100, area reservation section 350 that reserves a vacant area of flash memory 200 by referring to the file management information for terminal processing system 300, dummy file information generation section 360 that generates the dummy file information of the area reserved for in-card processing system 100, and reserve area notification section 370 that notifies the reserve area to in-card processing system 100. Likewise, cache memory 400 comprises file information holding section 410 that holds file management information 230 for terminal processing system 300 that is read out from flash memory 200 and file information writing section 420 that writes the updated file management information into flash memory 200.

For systems for file management like the present embodiment, as mentioned earlier, the FAT file system that makes use of the FAT (File Allocation Table), NTFS (Windows (registered trademark) NT File System), and UFS (Unix (registered trademark) File System) are known. In this text, cases will be described where FAT is used for the management of files.

An overview of FAT will be described now.

Figure 7:
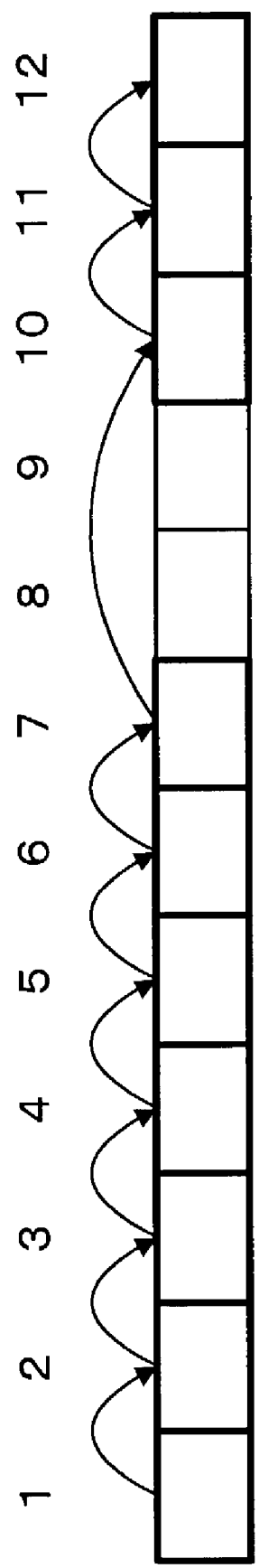
FIG. 7 shows a recording pattern of actual data in a secure card.

As shown in FIG. 7, the data stored in flash memory 200 is recorded on a per cluster unit basis, and the data of a large file that cannot be accommodated in one cluster is divided into a number of clusters and kept. The arrows in the figure denote the order of data-recorded clusters (connection information). The use status of these clusters is recorded in the memory as file management information (also called "metadata").

An FAT is a table that manages the use status of clusters. FIG. 8A illustrates a portion of an FAT, while FIG. 8B illustrates a directory entry that constitutes file management information together with the FAT. A directory entry contains information including the file names, size, and top clusters, and such. An FAT contains description frames by the number of the clusters contained in the memory area (in the figure, the upper frames are serial numbers and the lower frames are the description frames. The actual table does not contain the serial numbers). The connection information (the number of a cluster subsequent to the present one) is recorded into these frames. FIG. 8A illustrates cluster 32 through cluster 143. Referring to the location of each frame, a cluster's location can be specified into which actual data is recorded. When making reference to a file, first the top cluster is obtained by way of a search for the file name in the directory entry and reference is made to the FAT, and then the connections need to be tracked in order, starting from the top cluster. "−1" shows the end of a file. Also, when writing a file in, first registering the file name, size, and the top cluster and such with the directory entry, and registering the connection information with the FAT, then based on the connection information registered with the FAT, the actual data will be recorded into relevant clusters. Suppose in FIG. 6 file management information 230 and card-dedicated file management information 220 for terminal processing system 300 are composed of an FAT and a directory entry like the ones described above. Furthermore, file management information 220 recorded in flash memory 200 can be read out by any terminal apparatus, and it is by way of reading and recording this information that a terminal apparatus performs file management.

In-card processing system 100, when newly writing, appending, or deleting data with flash memory 200, notifies the size of such data to the terminal apparatus and requests to change the data storage area size.

When in-card processing system 100 issues a reservation request for a data storage area, the terminal apparatus reserves a data storage area upon its file management information 230, produces dummy file information in which cluster connection information is set dummy as file management information with respect to the data storage area, and updates file management information 230 using this dummy file information. By this means, each terminal apparatus, when reading out file management information 230, will learn that the data storage area is in use, yet will not be able to learn the precise information as to the actual data of a file.

By contrast, upon being notified of the reserve data storage area from terminal processing system 300, in-card processing system 100 writes actual data 210 of a card-dedicated file into the clusters of the area and writes file management information 220 of a card-dedicated file into flash memory 200. Location information that denotes as to the area of flash memory 200 where card-dedicated file management information 220 is written is held in management information search section 160. The writing of card-dedicated file management information 220 is performed making reference to this management information search section 160.

The terminal apparatus will not be notified of card-dedicated file management information 220 at all. By this means, security is preserved with respect to the actual data managed under this card-dedicated file management information 220.

Processing procedures will be described with a case where in-card processing system 100 requests a reservation of a data storage area to terminal processing system 300. Suppose that file management information 230 of flash memory 200 has been read out in advance by a terminal and held in file information holding section 410 in cache memory 400.

First, area change request section 130 of in-card processing system 100 sends a use area change request that includes the size information of the data that writing/deletion section 150 is going to write into terminal processing system 300 via communication section 110 (1). Area change request receiving section 340 of terminal processing system 300 notifies file information processing section 330 of the received use area change request, and file information processing section 330 refers to the file management information for terminal processing system 300 held in file information holding section 410 (2) and searches for a vacant area of flash memory 200. When there is no vacant area, in-card processing system 100 will be returned an error.

If there is a vacant area, area reservation section 350 will reserve in the file management information for terminal processing system 300 an area of the size included in the use area change request (3), dummy file information generation section 360 will generate dummy file management information whereby the area will be regarded as in use (4), and file information processing section 330 will add this dummy file information to the directory entry and FAT of the file management information for terminal processing system 300 held in file information holding section 410 (5).

In the present case, the file name information in the directory entry may be either random or regular (terminal identifier+number). The connection information in the FAT can likewise be random or sequential.

The updated file management information will be written over flash memory 200 by means of file information writing section 420 (6). By the way, this overwriting of the file management information depends on a terminal's processing method and may not occur at this timing.

File information processing section 330 notifies in-card processing system 100 of the reserve area through reserve area notifying section 370 (7).

Reserve area information reception section 140 of in-card processing system 100 receives reserve area information from terminal processing system 300 and sends this information to writing/deletion section 150. writing/deletion section 150 writes actual data 210 into flash memory 200 in accordance with the reserve area information (8). At the same time, writing/deletion section 150 learns the recording location of card-dedicated file management information 220 by referring to the storage location information held in management information search section 160 (9) and records the file management information of actual data 210 into card-dedicated file management information 220 (10).

As to the method of holding information in card-dedicated file management information 220, any format will work as long as the managed actual data can be read out accurately later. In this specification, information is kept using the same format as the FAT.

A processing procedure will be described with a case where in-card processing system 100 requests a release of a data storage area to terminal processing system 300 (that is, a case where data is deleted). In in-card processing system 100, writing/deletion section 150 deletes actual data and corrects card-dedicated file management information 220. Area change request section 130 sends an area change (release) request that specifies an actual data deletion area, that is, a release location, to the terminal apparatus. The release location will be specified by the release area's top address and size, or it may be good as well to specify the release location using all the addresses.

In terminal processing system 300, upon receiving the use area change request, file information processing section 330 refers to the file management information for terminal processing system 300 held in file information holding section 410 to search for the file that uses the area in respect to which a release is in request, and corrects the file management information of the relevant file.

Figure 9:
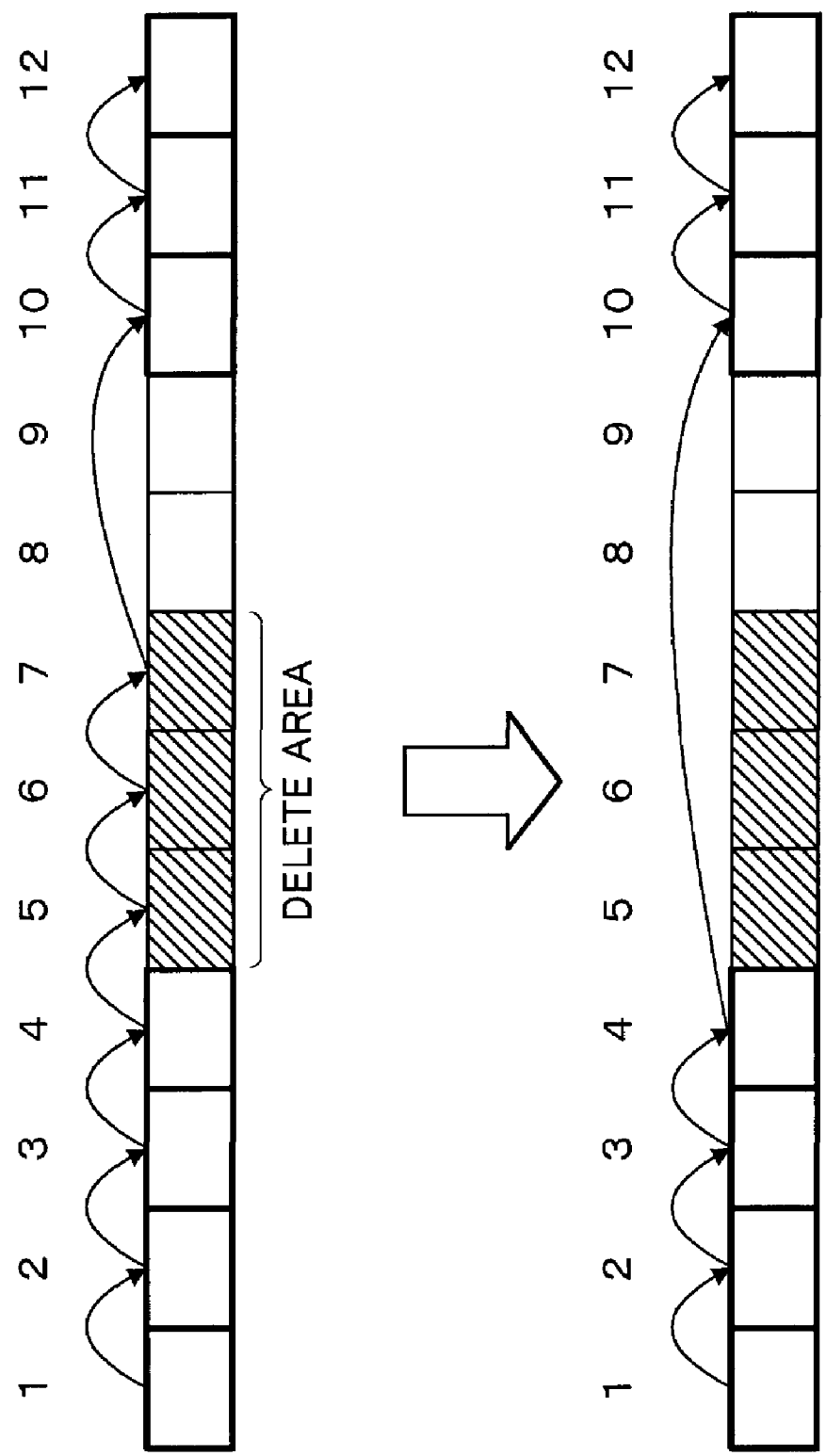
FIG. 9 shows a downscaling method for a dummy file according to Embodiment 1.

Then, as shown in FIG. 9, a processing is carried out whereby the dummy file's deletion area will be removed from the connection information of the file management information. When the whole dummy file is gone by the processing, the file management information of the dummy file will be deleted from the file management information for terminal processing system 300.

Next using two specific examples, a processing will be describe in detail whereby in-card processing system 100 requests terminal processing system 300 to reserve a data storage area.

Figure 10:
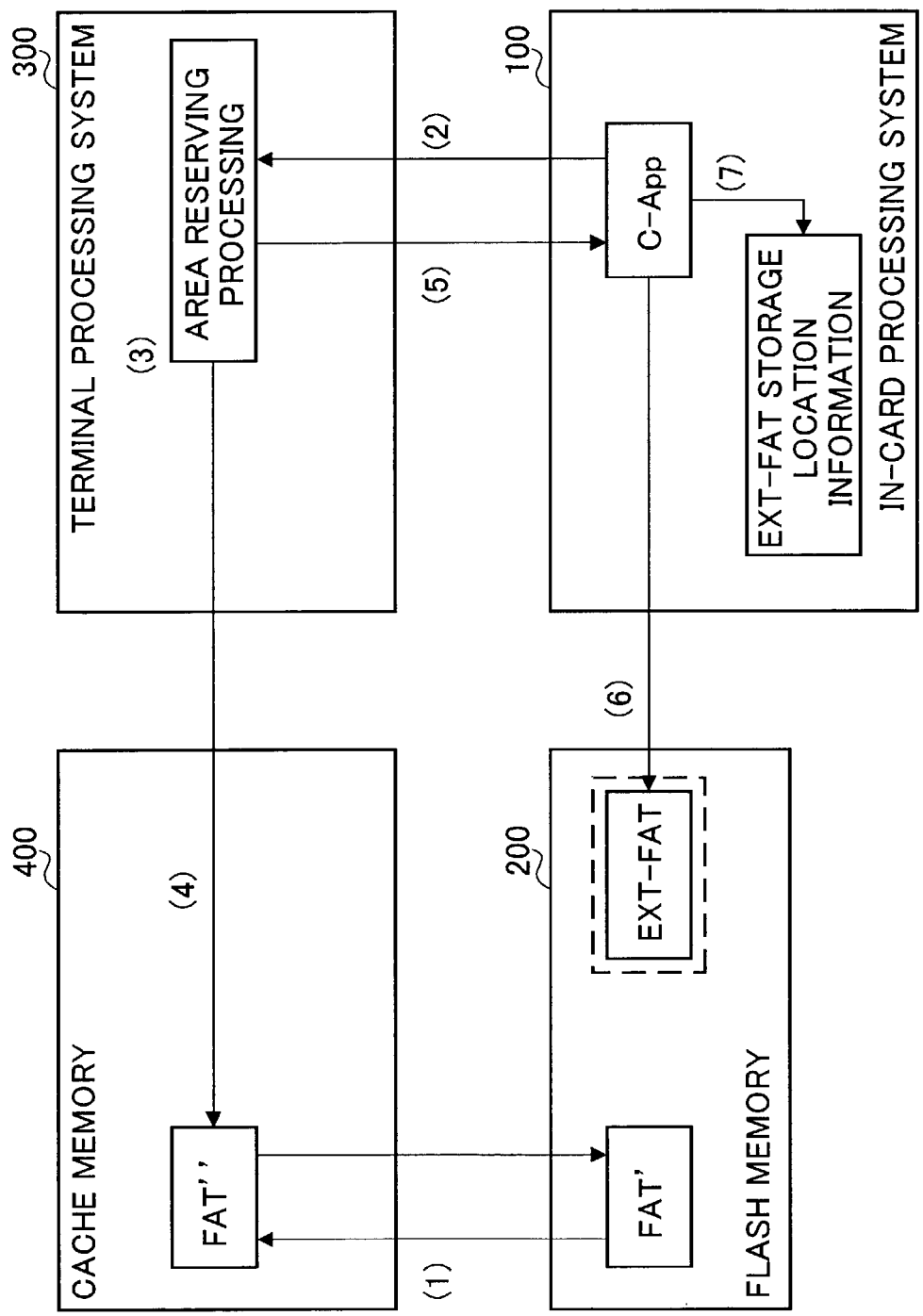
FIG. 10 shows an exclusive-control procedure in an EXT-FAT area according to Embodiment 1.

FIG. 10 illustrates a processing in respect to a case where in-card processing system 100 requests a reservation of a data storage area to terminal processing system 300 in a frame format. In this context, a case will be described where an EXT-FAT, which is extension file management information, performs management in respect to the data written into flash memory 200 (memory section) by in-card processing system 100. The EXT-FAT itself is written into flash memory, and there is a need to restrain direct access from the terminal apparatus. So a processing becomes necessary whereby the EXT-FAT area will be made into a dummy file and contained in the file management information of terminal processing system 300.

FIG. 10 illustrates a processing for reserving an EXT-FAT area inside the file management information for terminal processing system 300 in a frame format.

First, FAT' (corresponding to the file management information 230) stored in flash memory 200 is read out into cache memory 400 as FAT" (1). An application of the in-card processing system (C-App) notifies the size of an EXT-FAT to terminal processing system 300 (2). Terminal processing system 300 performs an area reservation processing and makes file management information as a dummy file (hereinafter "DMY") comparable to the size of an EXT-FAT (3) and adds the DMY information to FAT" (4). Terminal processing system 300 notifies in-card processing system 100 of the reserve area (5). C-App of in-card processing system 100 makes an EXT-FAT in accordance with the notified area information (6) and holds the storage location of the EXT-FAT in in-card processing system 100 (7).

By the file management information FAT" in cache memory 400, this EXT-FAT seems to be DMY to the terminal apparatus. Moreover, access to the actual data of the EXT-FAT from the terminal apparatus will be denied by the information (access control information) that is set forth on a per file/block basis and that indicates access control including "Not readable" and "Not writable" and such.

The EXT-FAT alone is described here. However, with respect to the area of an EXT directory, similar to the EXT-FAT case, a processing is performed whereby the area of an EXT directory will be made into a dummy file and contained inside the terminal-managed file management information FAT". Furthermore, with respect to an EXT directory, similar to an EXT-FAT, its storage location information will be held inside in-card processing system 100.

Incidentally, an EXT-FAT and an EXT directory entry relating to a root directory are fixed in size and they are necessary when in-card processing system 100 makes a card-dedicated file, so it can be made for instance by a card-issuing machine into a fixed area that a terminal apparatus has no direct access to.

Figure 11:
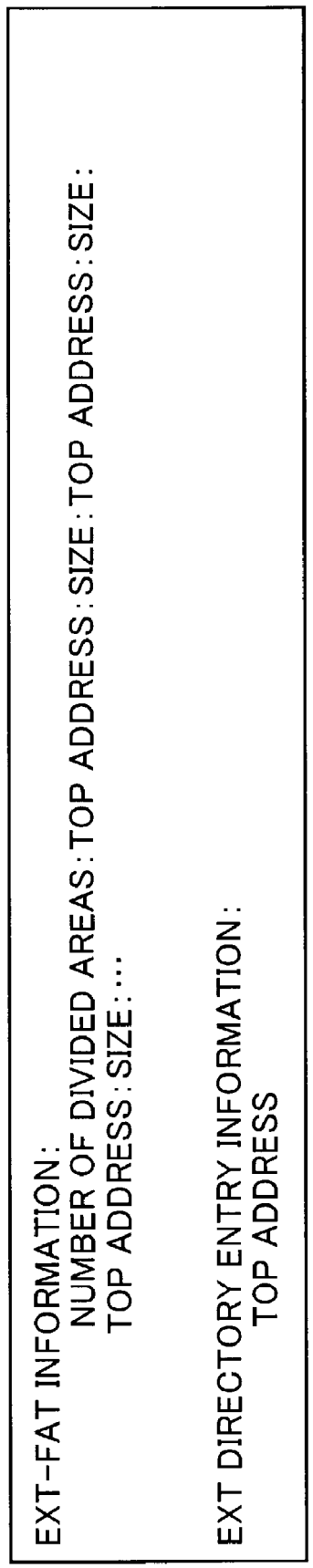
FIG. 11 shows an example of data held in a management information search section according to Embodiment 1.

FIG. 11 shows an example of storage location information of an EXT-FAT and an EXT directory entry held in management information search section 160 inside in-card processing system 100. A case is described here where an EXT-FAT area is divided into several and the EXT-FAT area is denoted by the top address and size in respect to all of the divided areas. Management information search section 160 holds the information inside the TRM (Tamper Resistant Module) area inaccessible from a terminal apparatus yet accessible from in-card processing system 100 alone.

Figure 12:
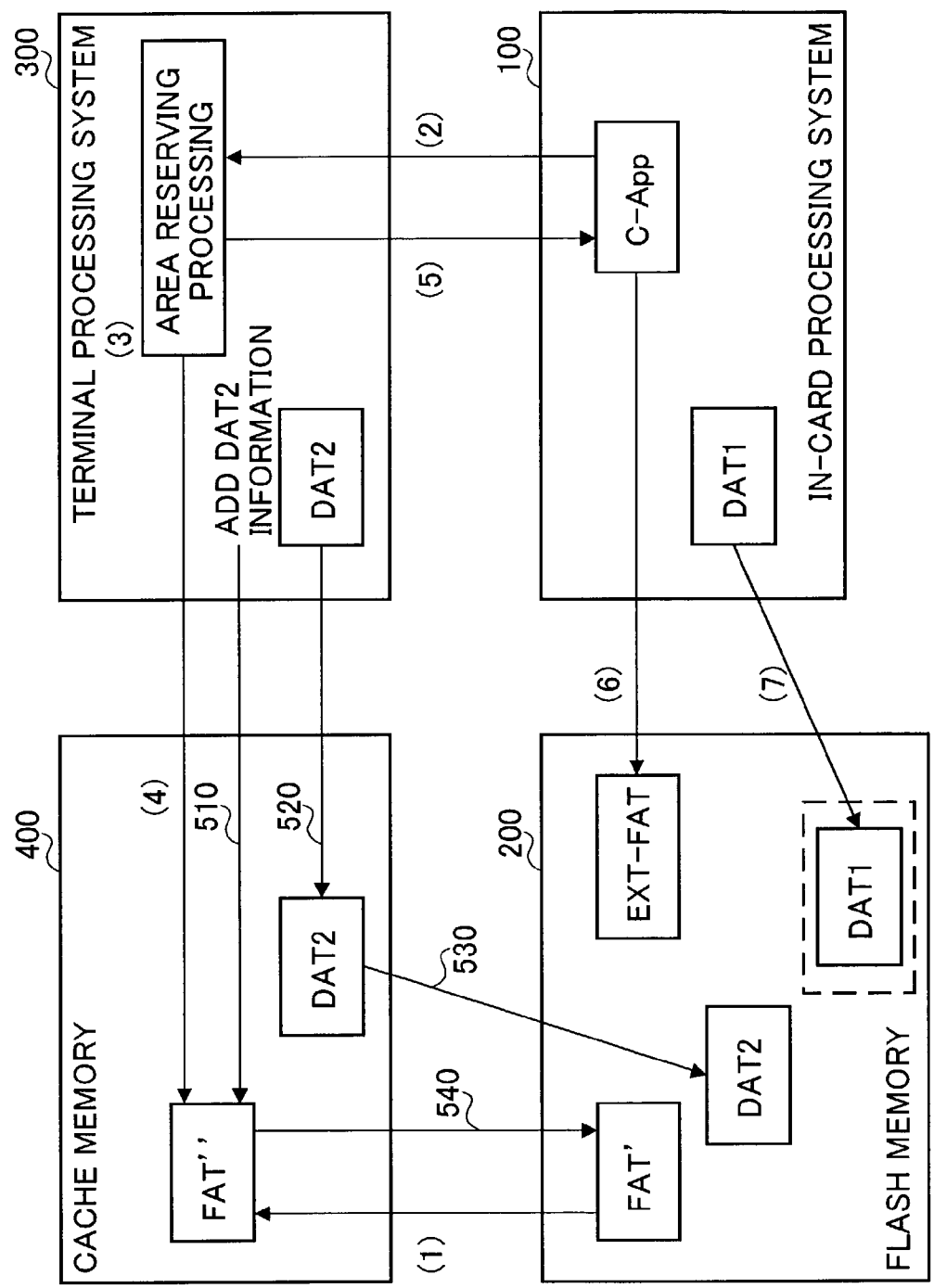
FIG. 12 shows a card-dedicated file making processing procedure according to Embodiment 1.

FIG. 12 illustrates another requesting processing for reserving data storage area for terminal processing system 300 in a frame format. A case will be described here where the data of a card-dedicated file (hereinafter "DAT 1") is newly made by in-card processing system 100.

First, FAT' stored in flash memory 200 is read out into cache memory 400 as FAT" (1). An application (C-App) of in-card processing system 100 notifies the size of DAT 1 to terminal processing system 300 (2). Terminal processing system 300 performs an area reservation processing and makes file management information as a dummy file (hereinafter "DMY") comparable to the size of DAT 1 (3) and adds the DMY 1 information to FAT" (4). Terminal processing system 300 notifies in-card processing system 100 of the reserve area (5). C-App adds the file management information of DAT 1 to the EXT-FAT in accordance with the notified area information (6) and at the same time writes DAT 1 in accordance with the file management information (7).

FIG. 13A illustrates FAT' before DMY 1 information is added thereto and FIG. 13B illustrates the then directory entry. FIG. 14A illustrates FAT' after DMY 1 information is added thereto and FIG. 14B illustrates the then directory entry. In FIG. 14A and FIG. 14B, upon receiving a reservation request for 14 clusters from in-card processing system 100, terminal processing system 300 adds information of a dummy file called "dummy 1" in quality of DMY 1 to FAT".

A dummy file of a card-dedicated file is thus contained in the file management information for terminal processing system 300. By this means, as shown in FIG. 12, exclusive control is made possible with respect to the writing area of card-dedicated file data (that is, DAT 1) even where terminal processing system 300 adds the information of DAT 2 to FAT" (510) and then DAT 2 is written from terminal processing system 300 into cache memory 400 (520), and whenever a processing for writing DAT 2 into flash memory 200 (530) or a processing for writing FAT" over FAT' (540) takes place.

When terminal processing system 300 notifies in-card processing system 100 of a reserve area, and if the area is a continuous one, the top address and size will be notified. Otherwise, since in-card processing system 100 knows the size, it suffices to notify only the top address. Or, if the area is divided into several, the top address and size will be notified with respect to all of the divided areas. It is good as well to notify all the addresses (cluster numbers).

A method for making a dummy file will be described next.

For instance in respect to the processing shown in FIG. 12, when a new area reservation request is made for the recording of data of a new card-dedicated file (hereinafter "DAT3") after DAT 1 is recorded, terminal processing system 300, following the same procedure of recording DAT 1, reserves an area, makes a dummy file, and notifies in-card processing system 100 of the reserve area. In-card processing system 100 then, upon being notified of the reserve area, adds the information of DAT 3 to the EXT-FAT and at the same time writes DAT3 into flash memory 200 according to the notified area information.

Figure 15:
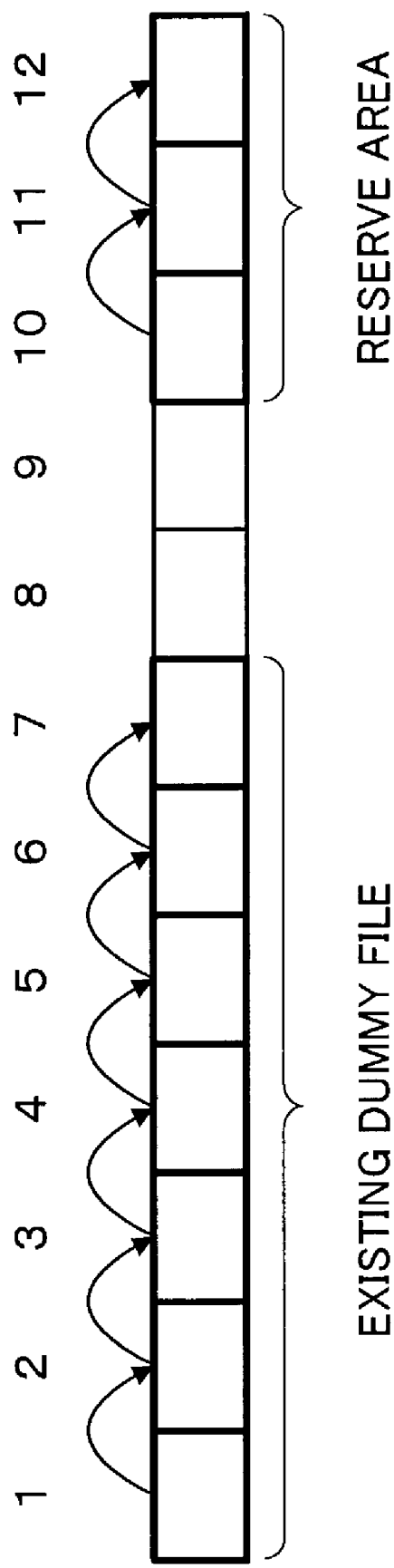
FIG. 15 shows a first pattern for making a dummy file, according to Embodiment 1.
Figure 16:
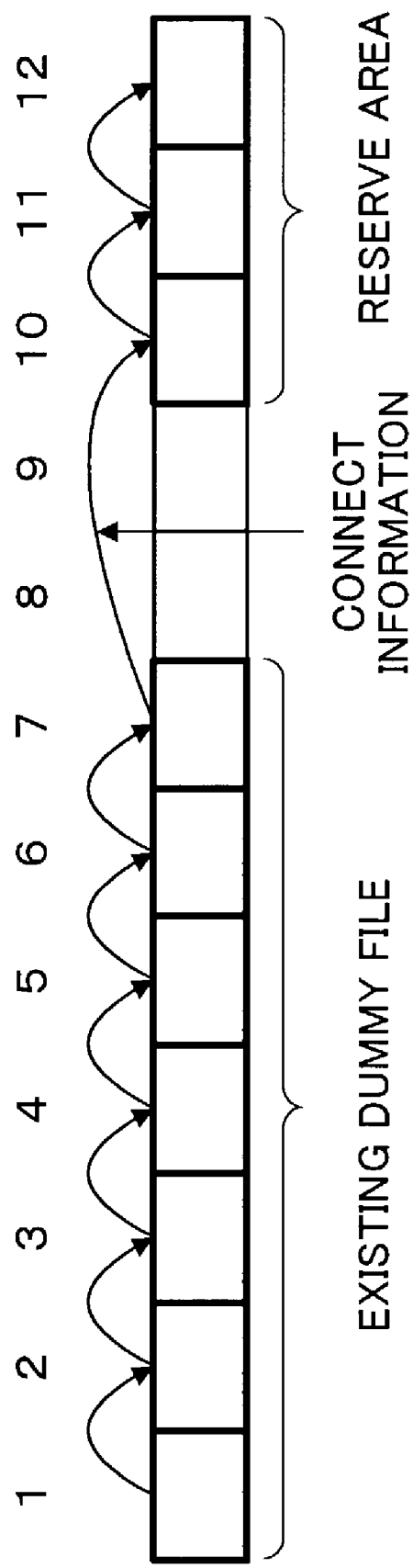
FIG. 16 shows a second pattern for making a dummy file, according to Embodiment 1.
Figure 17:
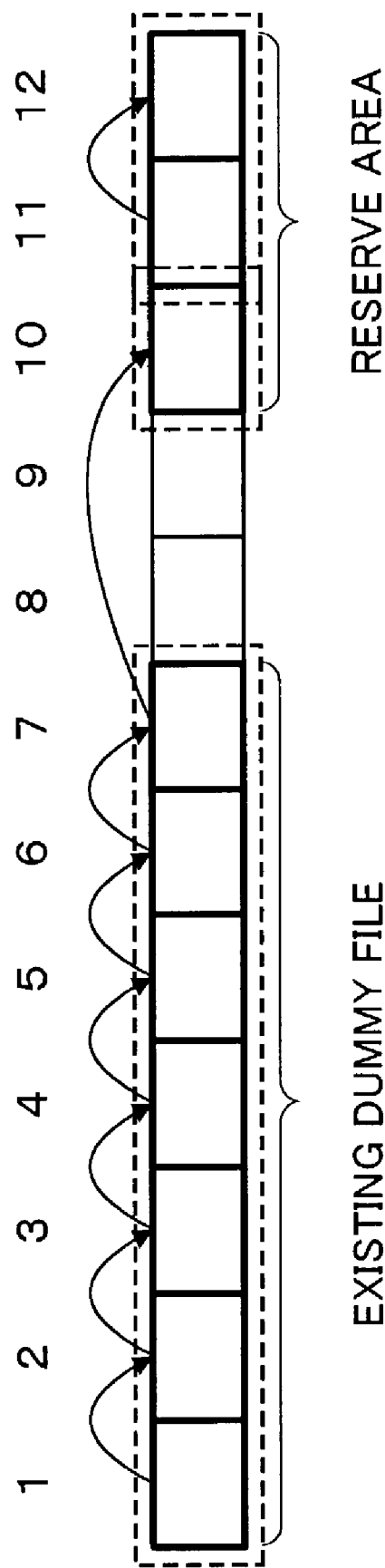
FIG. 17 shows a third pattern for making a dummy file, according to Embodiment 1.

Then as shown in FIG. 15, terminal processing system 300 can either make a reserve area (cluster 10 to 12) a new dummy file besides the existing dummy file (cluster 1 through 7) as shown in FIG. 15, or, as shown in FIG. 16, add new connection information to the existing dummy file and make a dummy file. Or, as shown in FIG. 17, it is good as well to make a dummy file on a fixed size basis (8 clusters in this example, that is, 1 through 7 and 10).

FIG. 18A illustrates an FAT' in respect to a case where a dummy file is made by the method shown in FIG. 15, and FIG. 18B illustrates the then directory entry. In the directory entry shown in FIG. 18B, "dummy 1" represents an existing dummy file, while "dummy 2" represents a newly made dummy file. Furthermore, FIG. 19A illustrates an FAT" in respect to a case where a dummy file is made by the method shown in FIG. 16, and FIG. 19B illustrates the then directory entry. In the FAT" shown in FIG. 19A, cluster 98 through 100 are clusters newly connected to an existing dummy file.

FIG. 20A likewise illustrates an EXT-FAT, which is the file management information of card-dedicated files, and FIG. 20B illustrates an EXT-directory entry, also file management information of card-dedicated files. The composition information of the actual card-dedicated files is stored here, and the information can be viewed only by way of in-card processing system 100. In comparison, the EXT-FAT shown in FIG. 20A and the FAT" shown in FIG. 18A or FIG. 19A differs in their connection information. Also, a dummy file may not always correspond to only one card-dedicated file. As a result, even when a terminal apparatus that can view only the FAT" successfully reads out a card-dedicated file, the terminal apparatus will still have difficulty interpreting the data accurately. By this means, security is further enhanced in respect to card-dedicated files.

The append-processing by in-card processing system 100 into a card-dedicated file and a processing for a case where a card-dedicated file is deleted or downscaled will be described next.

Figure 21:
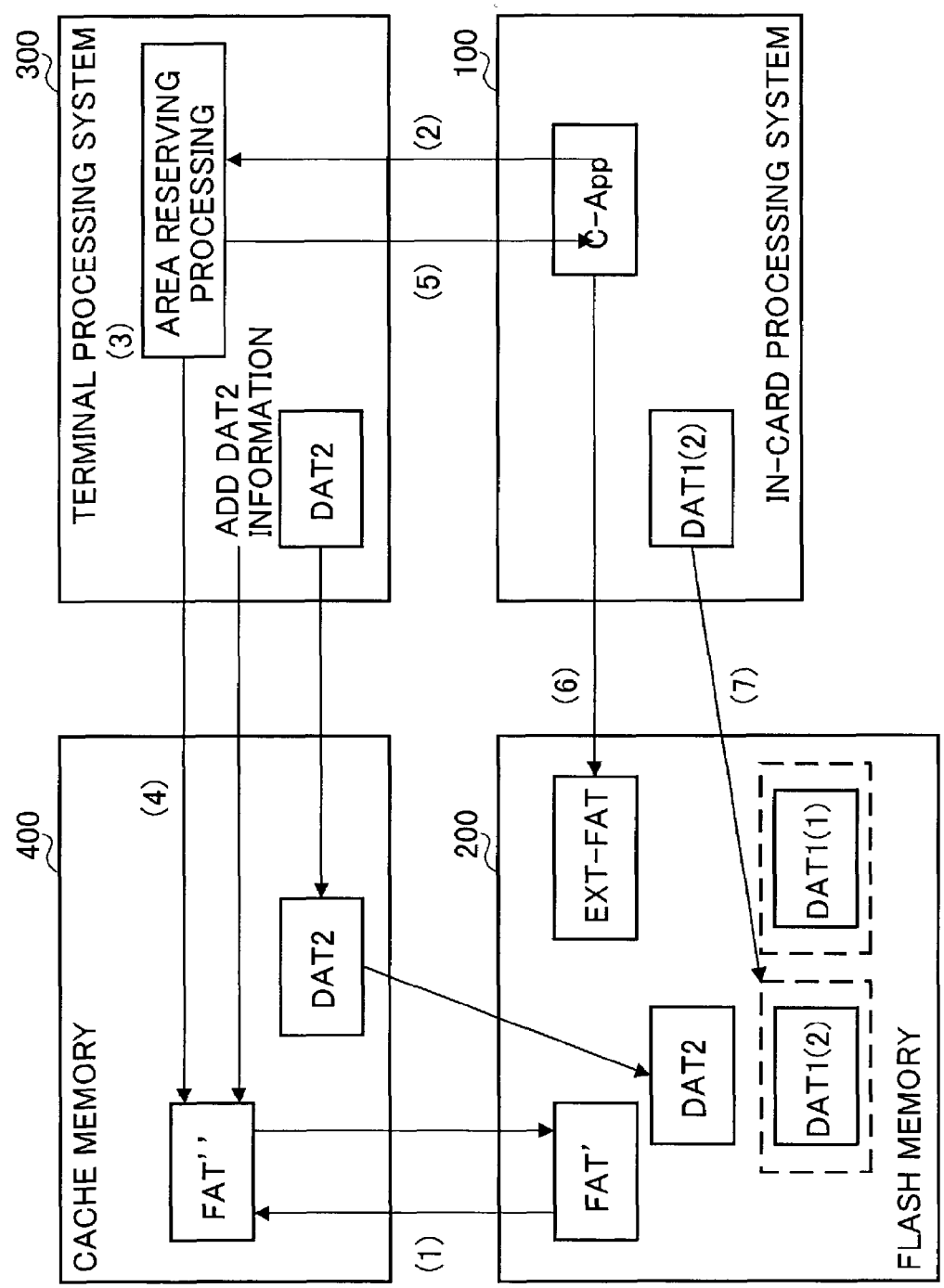
FIG. 21 shows an append-processing procedure according to Embodiment 1.

FIG. 21 illustrates an append-processing by in-card processing system 100 into a card-dedicated file in a frame format. A case will be described using the same figure here where, of the data (DAT 1) of a card-dedicated file, in-card processing system 100 appends new data (hereinafter "DAT 1(2)") to already recorded data (hereinafter "DAT 1(1)).

First, FAT' stored in flash memory 200 is read out into cache memory 400 as FAT" (1). An application of the in-card processing system (C-App) notifies the size of DAT 1(2) to terminal processing system 300 (2). Terminal processing system 300 performs an area reservation processing and makes file management information as a dummy file (hereinafter "DMY 2") comparable to the size of DAT 1(2) (3) and adds DMY 2 information to FAT" (4). Terminal processing system 300 notifies in-card processing system 100 of the reserve area (5). C-App updates the information of DAT 1 recorded in the EXT-FAT in accordance with the notified area information (6) and at the same time writes DAT 1(2) in (7).

Thus with respect to the append-processing into a card-dedicated file, the processing in terminal processing system 300 is not different from the FIG. 12 case at all. Only the EXT-FAT, to which in-card processing system 100 alone is able to refer, will be recorded to the effect of the append-processing into a card-dedicated file.

Figure 22:
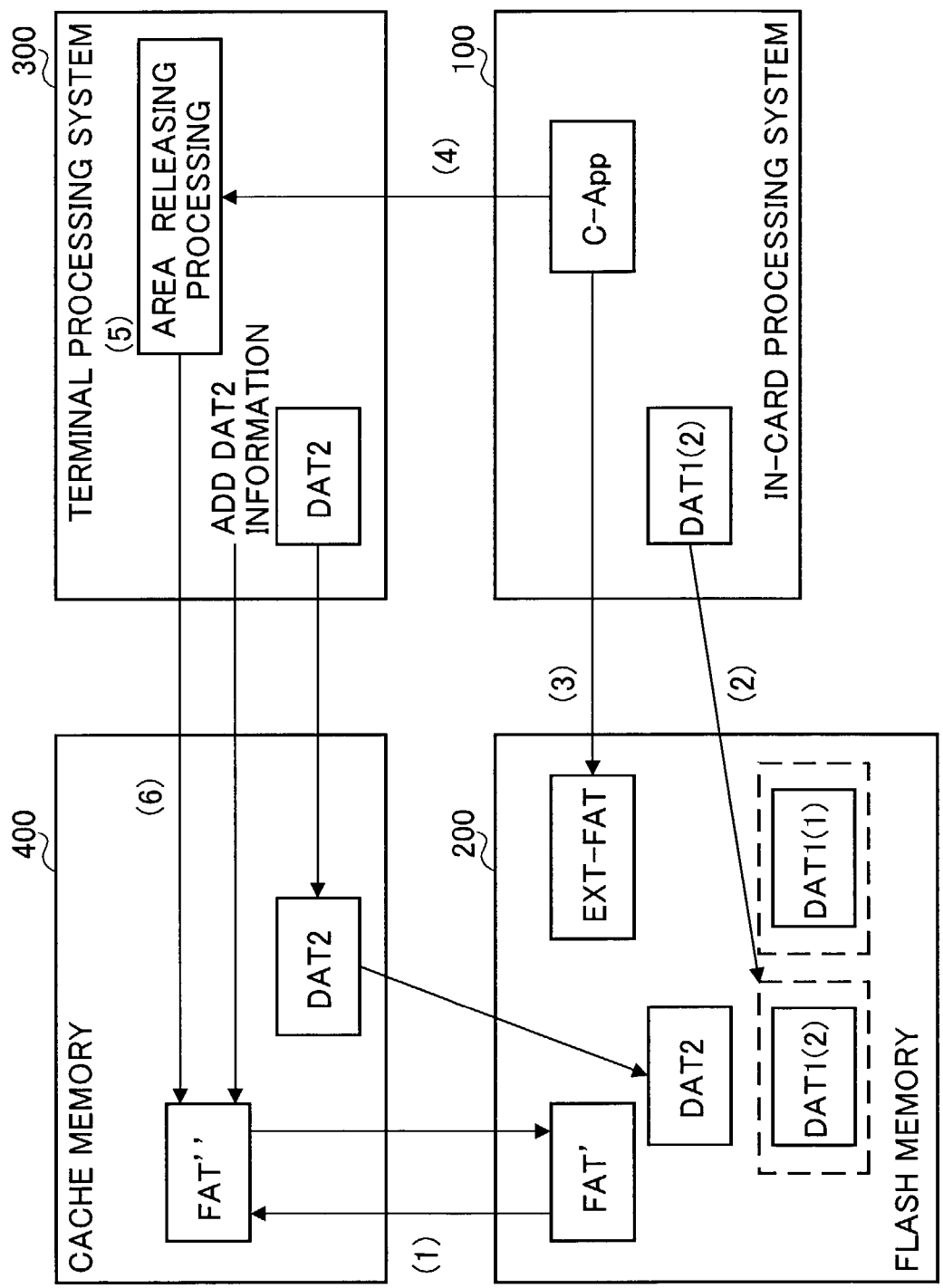
FIG. 22 shows an area release processing procedure according to Embodiment 1.

FIG. 22 shows a processing for deleting DAT 1(2) appended to DAT 1(1) by the above processing in a frame format.

First, FAT' stored in flash memory 200 is read out into cache memory 400 as FAT" (1). An application of the in-card processing system (C-App) deletes DAT 1(2) (2) and at the same time updates the information of DAT 1 recorded in the EXT-FAT (3). C-App notifies the location of DAT 1 (4). From the location information terminal processing system 300 searches the relevant file and hits upon DMY 2 (5). Terminal processing system 300 then corrects (downscales/deletes) the file management information of DMY 2 (6).

FIG. 23A illustrates the FAT according to FIG. 19A in a state where the dummy file "dummy 1" has been reduced by 3 clusters upon a request for a release of 3 clusters, namely cluster 87 through 89, and FIG. 23B illustrates the then directory entry.

According to the present invention, by thus setting up a dummy file in a reserve area for a card-dedicated file, it is possible to prevent inconsistencies between the file management information for terminal processing system 300 and the actual data record upon flash memory 200. It is also possible to perform exclusive control in such a way that an area that stores a card-dedicated file will store no other file.

In addition, according to the present embodiment, a dummy file is set up in a reserve area for a card-dedicated file. However, instead of setting up this dummy file, setting up a defect sector (denoted "−2" in FIG. 24A) in the reserve area for an FAT as shown in FIG. 24A will still make the exclusive control of card-dedicated files possible. In such case, no information will be added to the directory entry (see FIG. 24B). However, the EXT-FAT and EXT directory remain the same as when a reserve area is made into a dummy file.

Embodiment 2

Figure 25:
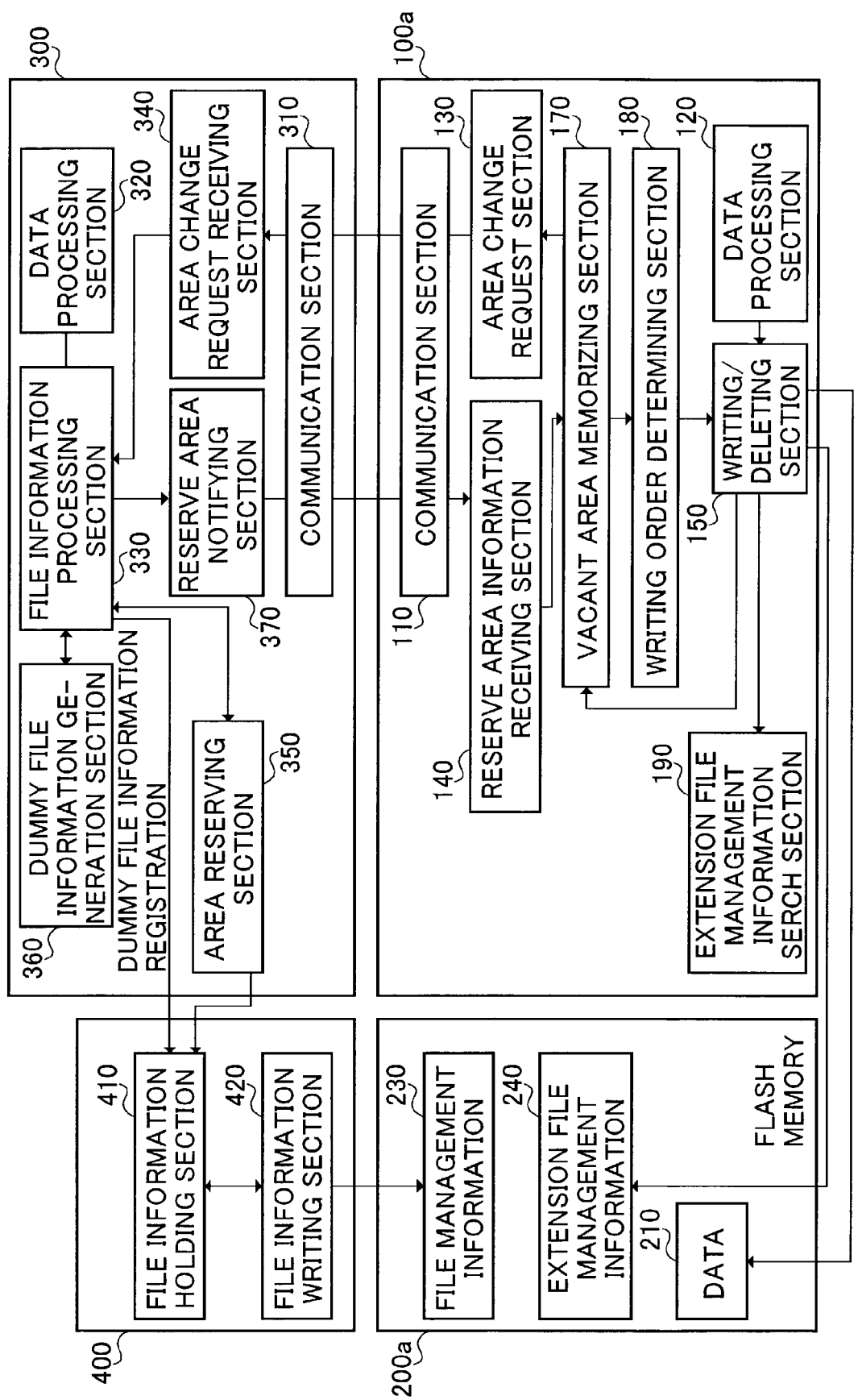
FIG. 25 shows a configuration of a secure card and of a terminal apparatus according to Embodiment 2 in a block diagram.

FIG. 25 shows in a block diagram a configuration of a secure card and a terminal apparatus according to Embodiment 2 of the present invention. In this figure, the sections that are identical with those of FIG. 6 will be given the same numerals without further description.

In-card processing system 100a of a secure card shown in FIG. 25 employs a configuration in which vacant area memorizing section 170 and writing order determining section 180 are added to in-card processing system 100 of a secure card shown in FIG. 6 and in which, furthermore, extension file management information search section 190 is provided in place of management information search section 160. Moreover, flash memory 200 in a secure card shown in FIG. 25 employs a configuration in which extension file management information 240 is provided instead of card-dedicated file management information 220 of flash memory 200 in a secure card shown in FIG. 6.

A feature of the present embodiment is that in-card processing system 100 assumes to use an area larger than the data size necessary for writing with a file (in the present embodiment, this will be called a "dummy file") and, supposing for instance one unit corresponds to 128 KB, requests and reserves n units of area for one dummy file.

Vacant area memorizing section 170 memorizes reserve areas for dummy files and, from these areas, specifies an area to use for writing.

Writing order determining section 180 determines the order of writing data into an area (the connection order of the clusters).

Also, extension file management information search section 190 holds storage location information of card-dedicated file management information 240 (hereinafter called "extension file management information") written in the order determined by writing order determining section 180.

As shown in FIG. 25, this in-card processing system 100a of a secure card comprises vacant area memorizing section 170 that memorizes reserve areas and specifies writing areas from the memorized reserve areas, area change request section 130 that specifies the size of a dummy file and requests the terminal apparatus for a reservation of an area of flash memory 200, reserve area information receiving section 140 that receives from the terminal apparatus the information of reserve areas and of the names of the dummy files the terminal apparatus has registered into these areas, writing/deletion section 150 that carries out the writing/deletion of actual data 210 into and from the writing areas specified by vacant area memorizing section 170 and the writing of extension file management information 240, writing order determining section 180 that specifies the order of data writing to writing/deletion section 150, and extension file management information search section 190 that holds the storage location information of extension file management information 240.

These extension file management information search section 190, writing/deletion section 150, and extension file management information 240 constitute the "writing location information storage section" of this in-card processing system 100a.

Writing/deletion section 150 of this in-card processing system 100a notifies vacant area memorizing section 170 of the size of the information that is to be written. When not holding a vacant area the size of the data that information writing/deletion section 150 is going to write, vacant area memorizing section 170 will request terminal processing system 300 via area change request section 130 for a reservation of an area larger than the difference between the size of the data and the size of the present vacant area. Area change request section 130 of in-card processing system 100a sends to the terminal apparatus a use area change request that contains the information of the size that vacant area memorizing section 170 made a request upon.

Area change request receiving section 340 of terminal processing system 300 notifies file information processing section 330 of the received use area change request. File information processing section 330 refers to the file management information for terminal processing system 300 held in file information holding section 410 and searches for a vacant area of flash memory 200a.

When there is a vacant area, area reservation section 350 will reserve an area of the size contained inside the use area change request in the file management information for terminal processing system 300, dummy file information production section 360 produces the management information of a dummy file whereby the area will be regarded as in use and file information processing section 330 will register this dummy file information with the file management information for terminal processing system 300.

File information processing system 330 notifies in-card processing system 100a via reserve area notifying section 370 of the reserve area and the name of the corresponding dummy file.

Reserve area information receiving section 140 of in-card processing system 100a notifies vacant area memorizing section 170 of reserve area information that contains the reserve area and dummy file name received from terminal processing system 300. Vacant area memorizing section 170 memorizes the reserve area information.

Vacant area memorizing section 170 notifies writing order determining section 180 of an area to be used for writing.

FIG. 26A shows an example of the actual data body that vacant area memorizing section 170 manages. In cluster 44, which is the top cluster of a dummy file, this dummy file name "dummy1.dmy" and the number of clusters in use excluding the top cluster, 13, are stored. In FIG. 26A, incidentally, "Data" means that a card-dedicated file is stored, and "Null" means that no data is stored, in other words, that it is a vacant area.

Writing order determining section 180 that has received an area to write in determines an order of writing data into the notified area.

Then, writing order determining section 180 determines upon an irregular writing order with respect to the area to write in and notifies this determined order to writing/deletion section 150. "Irregular" in this context means "non-sequential," which covers any order including a completely randomized alignment or a simply reverse order.

Writing/deletion section 150 writes the actual data body into flash memory 200a in accordance with the order determined by writing order determining section 180. Meanwhile referring to the storage location information of extension file management information 240 held in extension file management information search section 190, writing/deletion section 150 records the locations where actual data body has been written in into extension file management information 240.

Incidentally, as described earlier in respect to Embodiment 1, extension file management information 240, which is for recording the locations the actual data body is written, is also recorded in flash memory 200a. Consequently, extension file management section 240 is written into pre-reserved areas of flash memory 200a upon an area reservation request from area change request section 130. Here a "pre-reserved area" means an area that terminal processing system 300 had reserved in response to a request from area change request section 130 immediately before extension file management information 240 was written in and also an area that terminal processing system 300 had reserved prior thereto, which include all the areas reserved at the time extension file management 240 is written in flash memory 200a.

Extension file management information search section 190 and extension file management information 240 will be described later in detail.

Figure 27:
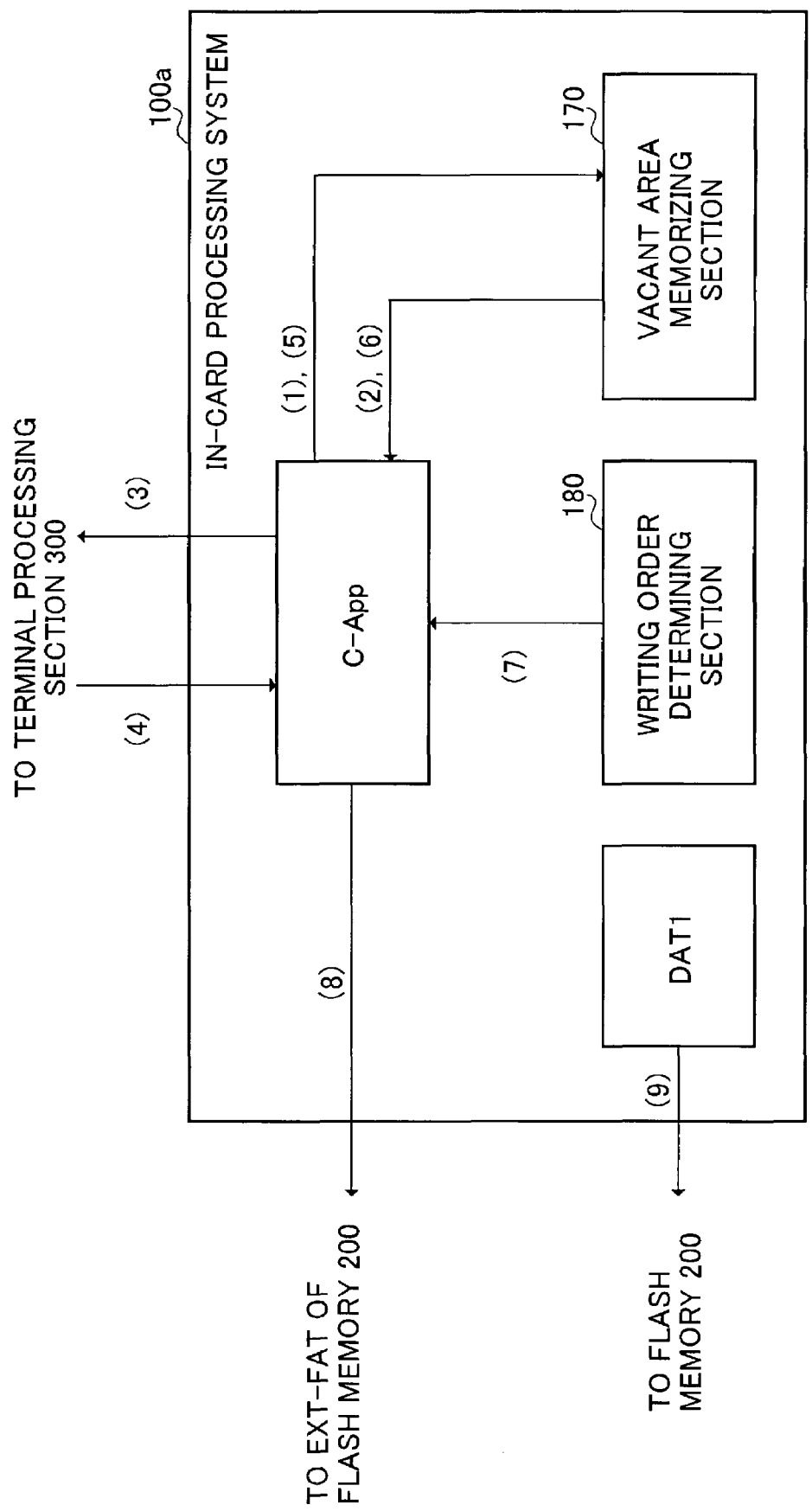
FIG. 27 shows a data writing procedure in respect to a card-dedicated file according to Embodiment 2.

FIG. 27 illustrates in a frame format a processing in respect to a case where in-card processing system 100a comprises vacant area memorizing section 170 and writing order determining section 180 and where a file related to DAT 1 is newly made. The processing on the terminal apparatus side is the same as FIG. 12 and will be omitted here.

An application (C-App) in in-card processing system 100 checks as to whether or not the in-card processing system holds vacant areas comparable to the size of DAT 1 (1) and, when there is no area comparable to the size of DAT 1, determines a reservation size to request to the terminal apparatus (2). Preferably, this is a size larger than the size short to store DAT 1 and is a size that is fixed at all times or a multiple of a certain fixed size (a multiple of the base 32 KB, for instance, will be 64 KB or 96 KB, depending on the shortage).

Then C-App notifies terminal processing system 300 (3) of the size determined in (2) and receives reserve area information and dummy file names that correspond to the reserve area information from terminal processing system 300 (4). After this, C-App has vacant area memorizing section 170 memorize the reserve area information received form terminal processing system 300 on a temporary basis (5) and vacant area memorizing section 170 determines an area to write DAT 1 in and notifies C-App thereof (6). Furthermore, writing order determining section 180 determines an order for writing DAT 1 into the writing area and informs C-App of the order (7). C-App adds the file management information of DAT 1 to the EXT-FAT in accordance with the notified order (8) and at the same time writes in DAT 1 in accordance with the file management information (9).

By doing thus, an effect is achieved that size information for a file that in-card processing system 100 makes needs not to be disclosed to a terminal apparatus. Also, when a vacant area the size of DAT 1 is held, it is possible to write in DAT 1 without issuing a reservation request to terminal processing system 300. As a result, the timing to write a file in and the timing of an area reservation request will not entirely coincide, whereby an effect is achieved that the file making operation by in-card processing system 100 will be unlikely to be learned by terminal processing system 300. Also, another effect is achieved that the number of times the reservation processing takes place will decrease and the overall processing will be reduced.

Furthermore, this secure card provided with writing order determining section 180 transforms a writing order, one that would normally be selected (perhaps by sequence from smaller addresses) unless a special processing is further introduced, into an irregular order on purpose. By thus modifying a writing order obviously irregular, even when a terminal apparatus illegally reads out the actual data body of a card-dedicated file, it will be difficult to guess the connection information, and data cannot be read out accurately. In short, an effect is achieved that confidentiality is enhanced.

A case was described here where in-card processing system 100a comprises both vacant area memorizing section 170 and writing order determining section 180. A configuration with only one of them is also possible.

Next, a processing procedure will be described with a case where in-card processing system 100 requests a release of a data storage area to terminal processing 300 (that is, a case where data is deleted).

Figure 28:
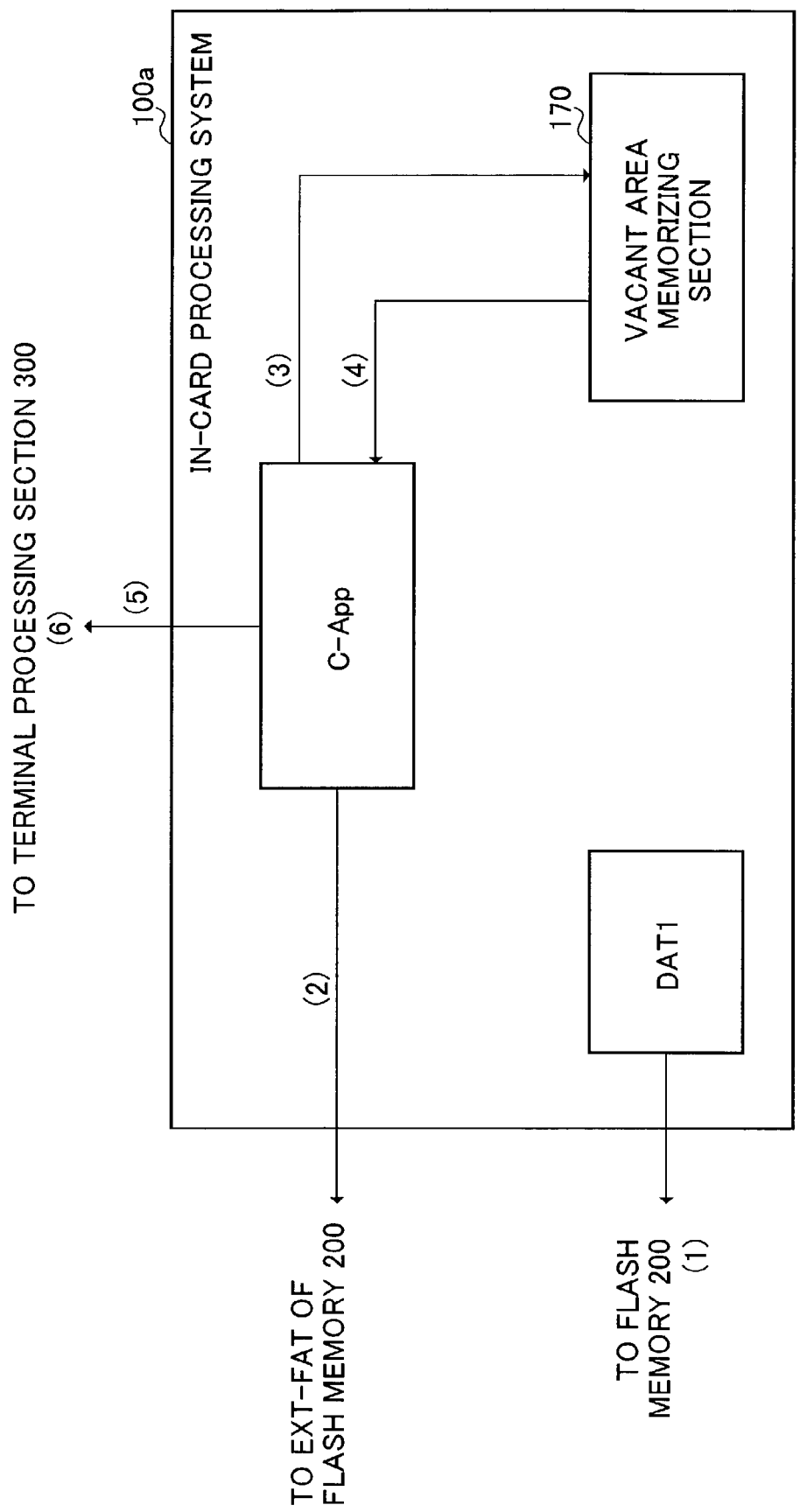
FIG. 28 shows a data deletion procedure according to Embodiment 2.

FIG. 28 illustrates a release processing in respect to a case where in-card processing system 100a comprises vacant area memorizing section 170 in a frame format.

In-card processing system 100a deletes the actual data body of DAT 1 (1), updates the EXT-FAT (2), and makes an area where DAT 1 has been deleted an unused area in in-card processing system 100a (3).

Then, when the vacant area contains an area the size of an entire dummy file, the relevant dummy file name will be designated (4) and an area release request will be issued to the terminal (5). Upon receiving this, the terminal deletes the file management information of the designated dummy file (6).

A method for determining whether a vacant area contains an area the size of an entire dummy file will be described with reference to FIG. 29A and FIG. 29B each showing an EXT-FAT and an EXT-directory entry respectively in respect to a case where vacant area memorizing section 170 is provided, as well as with reference to FIG. 26A, FIG. 26B, and FIG. 26C that each show data held in vacant area memorizing section 170.

In the EXT-FAT shown in FIG. 29A, in addition to connection information, top-cluster information in respect to a dummy file at the time of a reservation is recorded. That is to say, in FIG. 29A, the upper row is serial numbers, the middle row is connection information recording frames, and the lower row is cluster number recording frames. Suppose that the areas managed by the EXT-FAT shown in FIG. 29A, that is, cluster 44 through 47, cluster 64 through 67, cluster 86 through 89, and cluster 96 through 100, 17 clusters total, are reserved as one dummy file "dummy1.dmy." Incidentally, of the areas reserved as "dummy1.dmy," 98 through 100 are a vacant area. FIG. 26A shows the actual data bodies that correspond to FIG. 29A. In the 44th cluster, which is the top cluster of a dummy file, the dummy file's name "dummy1.dmy" and 13 clusters in use excluding the top cluster are stored. Incidentally, "Data" means that a file made in in-card processing system 100a is stored, whereas "Null" means that no data is stored, that is, that it is a vacant area.

If the last two clusters of file "sfile3," that is, cluster 87 and cluster 47, are deleted from the above state, the resulting state will be FIG. 26B. Then, the number of clusters in use in cluster 44 will decrease by 2 and become 11.

Furthermore, if the whole of "sfile3" is deleted, the resulting state will be FIG. 26C, in which case the number of clusters in use in cluster 44 will decrease by 11 and become 0. When the use cluster number stored in cluster 44 becomes 0, it will be possible, by means of taking out the dummy file name "dummy1.dmy" similarly stored in cluster 44 and by deleting the data of cluster 44, to decide that an entire dummy file has become a vacant area.

By this means, the terminal apparatus releases the areas that seem to be one dummy file altogether, and an effect is that the release processing can be performed by the same procedure as in the case of normal file deletion.

Furthermore, the timing of deleting actual data body and the timing of requesting a release to terminal processing system 300 will not entirely coincide, and an effect here is that the information deletion operation in in-card processing system 100a will be unlikely to be learned by terminal processing system 300.

A case was described where a dummy file is set up in a reserve area. However, as described earlier with Embodiment 1, this secure card having vacant area memorizing section 170 can be used with respect to a method whereby a defect sector is set up in a reserve area for file management information for terminal processing system 300 to perform exclusive control of a card-dedicated file.

In such case, however, since the terminal apparatus reserves an area not by the dummy file unit but by the cluster unit, the in-use/not-in-use flag setup in vacant area memorizing section 170 also needs to employ the cluster unit. In case of a release, too, since there is no concept of the file unit, a release request will be made if a certain volume of a continuous area becomes vacant or if a certain volume (not limited to a continuous area) becomes a vacant area.

Extension file management information 240 will be described next.

Data and the directory entry excluding the EXT-FAT can be read out without difficulty even when the writing order is determined randomly by writing order determining section 180. This is because the EXT-FAT memorizes the storage locations and the order. So even when the alignment is a random one, it is still possible to read them out by referring to the EXT-FAT.

However, when aligning an EXT-FAT itself randomly, information will be needed that indicates the EXT-FAT order.

This information that denotes the EXT-FAT order will be held in extension file management search section 190.

FIG. 30A shows an example of an EXT-FAT aligned in the right order. This EXT-FAT is divided by a fixed size (which in this context is one cluster size, that holds connection information of 32 clusters), which then will be reordered by writing order determining section 180 and stored in an irregular order like the cluster numbers shown as (x) in the figure.

Then as shown in FIG. 31, EXT-FAT order information, which contains the EXT-FAT storage order (the number of stored clusters shown as (x) in FIG. 30A) and the number of connection information held per EXT-FAT cluster will be held in extension file management information search section 190.

When reading a file out of the EXT-FAT stored in an irregular order as shown in FIG. 30A, this will be done as follows. FIG. 30A is an abridgement of an EXT-FAT with the top 16 clusters (0th though 511th connection information).

First, the name of file "sfile1" wanted for reference is searched in the EXT-directory entry in FIG. 30B and the file's top cluster (cluster 322) is obtained. Next, in order to obtain the number of a subsequent cluster connected to the top cluster, the connection information number per cluster (equivalent to 32 clusters in this context) in an EXT-FAT is obtained. Using the cluster number and the connection information number per cluster in an EXT-FAT, the information regarding the cluster subsequent to cluster 322 will be obtained as follows: that the information exists in the 11th cluster in EXT-FAT, that is, in the 527th cluster, from $(322+1)/32+1=11.09375$; and that the information is recorded in the 3rd frame from $(322+1)-(11-1) \times 32=3$.

By this means the subsequent cluster's storage cluster is obtained. Thereafter, by repeating this to the end of the file (with −1 stored in the connection information), reference can be made to entire "sfile1."

When the information of a newly made file is added to the EXT-FAT, from the number of a cluster in which the file is to be stored, which is designated by writing order determining section 180, it is possible, as when making reference to a file, to derive the number of a subsequent cluster that connects to the storage cluster in question, that is, the location to store connection information.

The present embodiment has a configuration in which extension file management information search section 190 holds the storage locations of extension file management information 240 and in which meta-data such as data storage locations in flash memory 220a is under across-the-board management. However, such meta-data may as well be recorded with actual data body into the area reserved for recording the actual data.

Moreover, although each embodiment above is described with reference to examples of the FAT file system, it is certainly possible to employ other file management systems such as NTFS and UFS.

As described above, according to the file management methods of the present invention, exclusive control can be implemented, whereby there will be no direct access from a terminal to an area that is in use with a card-dedicated file recorded therein by means of processing that takes place inside the card.

Moreover, it is possible to keep card-dedicated file information confidential.

Furthermore, a terminal apparatus can apply the file systems that are conventionally applied to memory cards to this memory card, and thus compatibility with respect to the terminals of conventional models is achieved.

Also, an area that a card-dedicated file is able to use is changeable, which makes it possible to make effective use of memory card functions.

Moreover, in order to prevent inconsistencies between the files recorded in a memory card and the file management information for a terminal processing system without leaking the file information made and stored in an in-card processing system, one conceivable method is to make an area of a fixed size that cannot be directly accessed in advance, at the time a card is made. In comparison with this method, the present invention, an area in respect to which direct access is denied being size-changeable, is applicable to cases where it is inadequate or difficult to fix sizes, including when handling use history and electronic receipts.

Furthermore, since an in-card processing system protects the actual data stored in a flash memory, a method is conceivable whereby an area that an in-card processing system writes data in will be controlled in such a way that the area denies direct access from a terminal processing system. In such case, however, the terminal processing system will try writing data into the data-written area. Although such attempt will be processed as an error, situations where such error occurs frequently can be envisaged given that the terminal apparatus sees the data-written area as a usable area and will continue trying to write in the same area. However, with the present invention, a terminal processing system has knowledge of the reserve areas of an in-card processing system, and as a result such writing error will not occur.

The present invention is not limited to the above-described embodiments, and various variations and changes may be possible without departing from the scope of the present invention.

This application is based on Japanese Patent Application No.2001-242499 filed on Aug. 9, 2001, entire contents of which are expressly incorporated by reference herein.

What is claimed is:

1. A file management method for use with a memory card having a memory accessible from a first processing system within a memory card and from a second processing system within a terminal apparatus configured to directly access said memory, the file management method comprising:
   requesting, by the first processing system, to the second processing system, a reservation of an area of the memory;
   implementing, by the second processing system, upon receiving the requesting from the first processing system, a reserving process for an area of the memory;
   reflecting, by the second processing system, information of the area reserved in the implementing, upon file management information; and
   writing, by the first processing system, data into the area reserved by the second processing system in the implementing,
   wherein the first processing system does not notify file management information that results from the writing to the second processing system.

2. The file management method according to claim 1, wherein the first processing system notifies the second processing system of a size of a use area, the second processing system reserving an area of the memory corresponding to the size notified by the first processing system.

3. The file management method according to claim 1, wherein the first processing system notifies the second processing system of a size larger than a size of a use area, the second processing system reserves an area of the memory corresponding to the size notified by the first processing system, and the first processing system determines a use area within the reserved area.

4. The file management method according to claim 1, wherein the second processing system registers a dummy file as file management information of the area reserved in the implementing, and the first processing system stores writing location information of data written in the area, in a location to which first processing system alone is able to refer.

5. The file management method according to claim 1, wherein the second processing system registers the area reserved in reserving as a defect area with the file management information, and the first processing system stores writing location information of data written in the area in a location to which first processing system alone is able to refer.

6. The file management method according to claim 1, wherein the first processing system deletes a portion of data stored in a use area of the memory section and requests the second processing system to release the area of the deleted data, and the second processing system, upon receiving the release request, performs releasing with respect to the area of the memory of the deleted data and reflects information of the released area upon file management information for the second processing system.

7. A file management method for use with a memory card having a memory accessible from a first processing system within a memory card and a second processing system within a terminal apparatus configured to directly access the memory, the file management method comprising:
   requesting, by the first processing system, to second processing system, a reservation of an area of the memory;
   implementing, by the second processing system, upon receiving the requesting from the first processing system, a reserving process for an area of the memory;
   reflecting, by the second processing system, information of the area reserved in the implementing, upon file management information for the second processing system; and
   writing, by the first processing system, data of a file management system for the first processing system into the area reserved by the second processing system in the implementing.

8. The file management method according to claim 7, wherein the first processing system does not notify the file management information that results from the writing to the second processing system.

9. A terminal apparatus that accesses a memory of a memory card and performs file management, the terminal apparatus comprising:
   a request receiver that receives a request for reserving an area of said memory from a processing system within said memory card;
   an area reserver that reserves an area of said memory based upon the request received by said request receiver;
   a file information processor that reflects information of the area reserved by said area reserver upon file management information for said terminal apparatus; and
   a reserve area transmitter that transmits information of the area reserved by said area reserver to the processing system within said memory card.

10. The terminal apparatus according to claim 9, wherein said file information processor registers a dummy file as file management information of the area reserved by said area reserver.

11. The terminal apparatus according to claim 9, wherein said file information processor registers the area reserved by said area reserver as a defect area with the file management information.

12. A memory card having a memory accessible from a processing system within said memory card and from a processing system in a terminal apparatus, said processing system within said memory card comprising:
   an area reservation requester that specifies a size and requests reservation of an area of said memory to said processing system in said terminal apparatus;
   a reserved area receiver that receives notification of a reserved area from said processing system in said terminal apparatus;
   a writer that writes data into the reserved area of said memory; and
   a writing location information storage that stores writing location information of the data written in the reserved area such that said processing system within said memory card alone is able to refer to the stored information.

13. A memory card having a memory accessible from a processing system within said memory card and from a processing system in a terminal apparatus, said processing system within said memory card comprising:

an area reservation requester that specifies a size and requests reservation of an area of said memory to said processing system in said terminal apparatus;

a reserve area receiver that receives notification of a reserved area from said processing system in said terminal apparatus;

a vacant area storage that stores the reserved area and a vacant area remaining after a writing area is specified in the stored reserved area;

a writer that writes data into the writing area specified by said vacant area storage; and a writing location information storage that stores writing location information of the data written in the writing area such that said processing system within said memory card alone is able to refer to the stored information.

14. The memory card according to claim 13, wherein said vacant area storage specifies the vacant area as a writing area when an area in said memory necessary to write new data is smaller than the vacant area, and said vacant area storage requests reservation of a new area from said processing system in said terminal apparatus via said area reservation requester when the necessary area to write new data is larger than the vacant area.

15. The memory card according to claim 13, wherein, when a portion of data stored in said memory is deleted, said vacant area storage stores an area of the deleted data as a vacant area, and wherein, when the vacant area fulfills a predetermined requirement, said vacant area storage requests release of the vacant area, via said area reservation requester to said processing system in said terminal apparatus.

16. The memory card according to claim 12, wherein said writing location information storage comprises a location information writer that writes information of a writing location of the data into the already reserved area of said memory, and a management information search that stores a storage location in which said location information writer writes the writing location information.

17. The memory card according to claim 13, wherein said writing location information storage comprises a location information writer that writes information of a writing location of the data into the already reserved area of said memory, and a management information search that stores a storage location in which said location information writer writes the writing location information.

18. The memory card according to claim 12, further comprising a writing order determiner that determines a writing order of data into the reserved area, wherein said writer writes data in accordance with the writing order determined by said writing order determiner.

19. The memory card according to claim 13, further comprising a writing order determiner that determines a writing order of data into the reserved area, wherein said writer writes data in accordance with the writing order determined by said writing order determiner.

20. The memory card according to claim 16, further comprising a writing order determiner that determines a writing order of data into the reserved area, wherein said location information writer, that writes information of a writing location of the data, writes the information of the writing location in the writing order determined by said writing order determiner, and wherein said management information search stores the writing order.

21. The memory card according to claim 17, further comprising a writing order determiner that determines a writing order of data into the reserved area, wherein said location information writer that writes information of a writing location of the data, writes the information of the writing location in the writing order determined by said writing order determiner, and wherein said management information search stores the writing order.

* * * * *